United States Patent
Suh et al.

(10) Patent No.: US 7,701,819 B2
(45) Date of Patent: Apr. 20, 2010

(54) RECORDING MEDIUM, METHOD OF CONFIGURING CONTROL INFORMATION THEREOF, RECORDING AND REPRODUCING METHOD USING THE SAME, AND APPARATUS THEREOF

(75) Inventors: Sang Woon Suh, Seoul (KR); Jin Yong Kim, Seongnam-si (KR)

(73) Assignee: LG Electronics, Inc., Seoul (KR)

( * ) Notice: Subject to any disclaimer, the term of this patent is extended or adjusted under 35 U.S.C. 154(b) by 19 days.

(21) Appl. No.: 11/907,661

(22) Filed: Oct. 16, 2007

(65) Prior Publication Data

US 2008/0043588 A1 Feb. 21, 2008

Related U.S. Application Data

(63) Continuation of application No. 10/918,397, filed on Aug. 16, 2004, now Pat. No. 7,342,857.

(30) Foreign Application Priority Data

| Aug. 14, 2003 | (KR) | .................. 10-2003-0056540 |
| Sep. 4, 2003  | (KR) | .................. 10-2003-0061785 |
| Sep. 15, 2003 | (KR) | .................. 10-2003-0063591 |
| Sep. 22, 2003 | (KR) | .................. 10-2003-0065628 |

(51) Int. Cl.
   *G11B 7/00* (2006.01)
(52) U.S. Cl. ................................. 369/47.27
(58) Field of Classification Search ............... 369/94, 369/53.1, 53.22, 47.27, 47.5, 47.1, 47.53, 369/59.11, 59.12, 275.3
See application file for complete search history.

(56) References Cited

U.S. PATENT DOCUMENTS

| 5,361,173 | A | 11/1994 | Ishii et al. |
| 5,485,469 | A | 1/1996 | Suzuki |
| 5,502,702 | A | 3/1996 | Nakajo |
| 5,590,096 | A | 12/1996 | Ohtsuka et al. |

(Continued)

FOREIGN PATENT DOCUMENTS

AU  2004254437  1/2005

(Continued)

OTHER PUBLICATIONS

Office Action issued Dec. 5, 2008 by the Chinese Patent Office in counterpart Chinese Patent Application No. 200710127832.

(Continued)

*Primary Examiner*—Nabil Z Hindu
(74) *Attorney, Agent, or Firm*—Harness, Dickey & Pierce, P.L.C.

(57) ABSTRACT

A data structure of a control information for use with a computer-readable recording medium having multiple recording layers. The control information includes first information unit for a first recording layer and second information unit for a second recording layer. The first information unit includes write strategy parameters for a first write strategy type to be used for the first recording layer, and the second information unit includes write strategy parameters for a second write strategy type to be used for the second recording layer. The second write strategy type being the same or different from the first write strategy type.

42 Claims, 21 Drawing Sheets

U.S. PATENT DOCUMENTS

| | | | |
|---|---|---|---|
| 5,636,631 A | 6/1997 | Waitz et al. |
| 5,764,621 A | 6/1998 | Choi |
| 5,835,462 A | 11/1998 | Mimnagh |
| 5,914,920 A | 6/1999 | Yokogawa |
| 6,335,070 B1 | 1/2002 | Tomita |
| 6,415,435 B1 | 7/2002 | McIntyre |
| 6,480,450 B1 | 11/2002 | Fujii et al. |
| 6,487,713 B1 | 11/2002 | Cohen et al. |
| 6,504,806 B1 | 1/2003 | Nakajo |
| 6,535,470 B1 | 3/2003 | Wu |
| 6,643,233 B1 | 11/2003 | Yen et al. |
| 6,711,107 B2 | 3/2004 | Chao et al. |
| 6,868,054 B1 | 3/2005 | Ko |
| 6,891,786 B2 | 5/2005 | Sato |
| 6,894,961 B1 | 5/2005 | Osakabe |
| 6,996,047 B2 | 2/2006 | Nagano |
| 6,999,393 B2 | 2/2006 | Yamada |
| 7,012,878 B2 | 3/2006 | Shinotsuka et al. |
| 7,075,871 B2 | 7/2006 | Kato et al. |
| 7,088,667 B2 | 8/2006 | Kobayashi |
| 7,161,881 B2 | 1/2007 | Pereira |
| 7,170,841 B2 | 1/2007 | Shoji et al. |
| 7,193,948 B2 | 3/2007 | Furukawa et al. |
| 7,218,585 B2 | 5/2007 | Tanii et al. |
| 7,304,938 B2 * | 12/2007 | Hwang et al. | 369/275.3 |
| 7,345,970 B2 | 3/2008 | Kim et al. |
| 7,414,936 B2 | 8/2008 | Tasaka et al. |
| 2001/0044935 A1 | 11/2001 | Kitayama |
| 2001/0053114 A1 | 12/2001 | Miyake et al. |
| 2001/0053115 A1 | 12/2001 | Nobukuni et al. |
| 2002/0021656 A1 | 2/2002 | Tsukagoshi et al. |
| 2002/0044509 A1 | 4/2002 | Nakajima |
| 2002/0048241 A1 | 4/2002 | Kumagai et al. |
| 2002/0048646 A1 | 4/2002 | Tomura et al. |
| 2002/0085470 A1 | 7/2002 | Yokoi |
| 2002/0089914 A1 | 7/2002 | Nakajo |
| 2002/0114234 A1 | 8/2002 | Chao et al. |
| 2002/0126604 A1 | 9/2002 | Powelson et al. |
| 2002/0126611 A1 | 9/2002 | Chang |
| 2002/0159352 A1 | 10/2002 | Yamada |
| 2002/0167879 A1 | 11/2002 | Ohno |
| 2002/0167880 A1 | 11/2002 | Ando et al. |
| 2003/0021201 A1 | 1/2003 | Kobayashi |
| 2003/0021202 A1 | 1/2003 | Usui et al. |
| 2003/0039187 A1 | 2/2003 | Geutskens |
| 2003/0058771 A1 | 3/2003 | Furukawa et al. |
| 2003/0072251 A1 | 4/2003 | Kondo |
| 2003/0076775 A1 | 4/2003 | Sato et al. |
| 2003/0086345 A1 | 5/2003 | Ueki |
| 2003/0086346 A1 | 5/2003 | Fukumoto |
| 2003/0137915 A1 | 7/2003 | Shoji et al. |
| 2003/0151994 A1 | 8/2003 | Tasaka et al. |
| 2003/0159135 A1 | 8/2003 | Hiller et al. |
| 2003/0185130 A1 | 10/2003 | Kamperman et al. |
| 2003/0223339 A1 | 12/2003 | Taniguchi et al. |
| 2003/0231567 A1 | 12/2003 | Moritomo |
| 2003/0237024 A1 | 12/2003 | Ogawa et al. |
| 2004/0001407 A1 | 1/2004 | Kim et al. |
| 2004/0004921 A1 | 1/2004 | Lee et al. |
| 2004/0010745 A1 | 1/2004 | Lee et al. |
| 2004/0013074 A1 | 1/2004 | Lee et al. |
| 2004/0022150 A1 | 2/2004 | Lee et al. |
| 2004/0030962 A1 | 2/2004 | Swaine et al. |
| 2004/0062160 A1 | 4/2004 | Park et al. |
| 2004/0076096 A1 | 4/2004 | Hwang et al. |
| 2004/0090888 A1 | 5/2004 | Park et al. |
| 2004/0114474 A1 | 6/2004 | Park et al. |
| 2004/0125717 A1 | 7/2004 | Ko et al. |
| 2004/0145980 A1 | 7/2004 | Park et al. |
| 2004/0223434 A1 | 11/2004 | Nishimura et al. |
| 2005/0019023 A1 | 1/2005 | Ko |
| 2005/0030853 A1 | 2/2005 | Lee et al. |
| 2005/0030870 A1 * | 2/2005 | Rijpers et al. | 369/59.11 |
| 2005/0036425 A1 | 2/2005 | Suh et al. |
| 2005/0038957 A1 | 2/2005 | Suh |
| 2006/0233059 A1 | 10/2006 | Suh et al. |
| 2008/0043588 A1 | 2/2008 | Suh et al. |

FOREIGN PATENT DOCUMENTS

| | | |
|---|---|---|
| CN | 1151071 A | 6/1997 |
| CN | 1182497 | 5/1998 |
| CN | 1400588 A | 3/2003 |
| CN | 1416115 | 5/2003 |
| EP | 0 265 984 | 5/1988 |
| EP | 0 552 903 A2 | 1/1993 |
| EP | 0 968 769 A2 | 1/2000 |
| EP | 1 128 383 A2 | 8/2001 |
| EP | 1 172 810 A2 | 1/2002 |
| EP | 1 244 097 A2 | 9/2002 |
| EP | 1 298 659 A1 | 4/2003 |
| EP | 1 308 942 A2 | 5/2003 |
| EP | 1 329 888 A1 | 7/2003 |
| EP | 1 331 631 A1 | 7/2003 |
| EP | 1 361 571 A1 | 11/2003 |
| EP | 1 369 850 | 12/2003 |
| EP | 1 369 850 A1 | 12/2003 |
| EP | 1 471 506 A1 | 10/2004 |
| EP | 1 522 994 A1 | 4/2005 |
| EP | 1 605 445 A2 | 12/2005 |
| JP | 6-309802 | 11/1994 |
| JP | 9-128899 | 5/1997 |
| JP | 09-134525 | 5/1997 |
| JP | 09-160761 | 6/1997 |
| JP | 9282661 | 10/1997 |
| JP | 11-85413 | 3/1999 |
| JP | 2000-113458 | 4/2000 |
| JP | 2000-163746 | 6/2000 |
| JP | 2001-52337 | 2/2001 |
| JP | 2002-050053 | 2/2002 |
| JP | 2002-074855 | 3/2002 |
| JP | 2002-230764 | 8/2002 |
| JP | 2002-245624 | 8/2002 |
| JP | 2002-245625 | 8/2002 |
| JP | 2002-352430 | 12/2002 |
| JP | 2002-352435 | 12/2002 |
| JP | 2003-006860 | 1/2003 |
| JP | 2003-045036 | 2/2003 |
| JP | 2003-178448 | 6/2003 |
| JP | 2003-203341 | 7/2003 |
| JP | 2003257026 A | 9/2003 |
| KR | 2001-0011557 | 2/2001 |
| RU | 2 092 910 | 10/1997 |
| TW | 509935 | 11/2002 |
| TW | 200301464 | 8/2005 |
| WO | WO 97/13244 | 4/1997 |
| WO | WO 00/79525 A1 | 12/2000 |
| WO | WO 01/06500 A2 | 1/2001 |
| WO | WO 02/17308 A1 | 2/2002 |
| WO | WO 02/29791 A1 | 4/2002 |
| WO | WO 02/065462 A1 | 8/2002 |
| WO | WO 02/086887 A1 | 10/2002 |
| WO | WO 02/086888 A2 | 10/2002 |
| WO | WO 02/089123 A1 | 11/2002 |
| WO | WO 03/010519 | 2/2003 |
| WO | WO 03/010519 A1 | 2/2003 |
| WO | WO 03/025935 A1 | 3/2003 |
| WO | WO 03/030153 A2 | 4/2003 |
| WO | WO 03/046896 | 6/2003 |
| WO | WO 03/067581 A1 | 8/2003 |
| WO | WO 03/075265 A2 | 9/2003 |
| WO | WO 03/105139 A1 | 12/2003 |
| WO | WO 2004/013845 A1 | 2/2004 |
| WO | WO 2004/015707 A1 | 2/2004 |

| WO | WO 2004/072966 A1 | 8/2004 |
| --- | --- | --- |
| WO | WO 2005/001819 A1 | 1/2005 |

OTHER PUBLICATIONS

Office Action issued Oct. 5, 2007 by the Japanese Patent Office in counterpart Japanese Patent Application No. 2006-523133.
Office Action issued Oct. 22, 2007 by the European Patent Office in counterpart European Patent Application No. 07016686.3-2210 (cited references previously submitted in the IDS filed Jan. 22, 2008).
Office Action issued Oct. 26, 2007 by the Chinese Patent Office in counterpart Chinese Patent Application No. 200610084094.0 (cited reference previously submitted in the IDS filed Jan. 22, 2008).
Office Action issued by the Japanese Patent Office on Jan. 25, 2008 in counterpart Japanese Patent Application No. 2006-523133.
Office Action issued Jan. 29, 2008 by the Indian Patent Office in counterpart Indian Patent Application No. 438/KOLNP/2006.
Office Action issued Jan. 25, 2008 by the Japanese Patent Office in counterpart Japanese Patent Application No. 2006-523136.
Search Report issued Apr. 15, 2008 by the European Patent Office in counterpart European Patent Application No. 07007644.3-2210.
Office Action issued Jun. 12, 2008 by the U.S. Patent and Trademark Office in counterpart U.S. Appl. No. 11/437,624.
Office Action issued Jun. 23, 2008 by the Russian Patent Office in counterpart Russian Patent Application No. 2004122413/28(024371).
Search Report issued Jul. 2, 2008 by the European Patent Office in counterpart European Patent Application No. 07120273.3-2210.
European Search Report issued May 7, 2007 in counterpart European Patent Application No. 06124032.1.
Office Action issued May 4, 2007 in counterpart European Patent Application No. 04 748 539.6.
International Search Report issued Apr. 21, 2005 in corresponding International Patent Application No. PCT/KR2004/002041.
Office Action issued Oct. 8, 2008 by the U.S. Patent and Trademark Office in related U.S. Appl. No. 11/440,047.
Office Action issued Oct. 7, 2008 by the U.S. Patent and Trademark Office in counterpart U.S. Appl. No. 11/189,767.
European Search Report corresponding to counterpart European Application No. 07017410.7 dated Mar. 27, 2009.
Extended Search Report issued Mar. 11, 2009 by the European Patent Office in counterpart European Patent Application No. 07007648.4-2217.
Extended Search Report issued Mar. 4, 2009 by the European Patent Office in counterpart European Patent Application No. 05771159.0-2210.
International Search Report issued Dec. 19, 2005 in counterpart International Patent Application No. PCT/KR2005/002518.
Office Action issued Mar. 5, 2009 by the USPTO in counterpart U.S. Appl. No. 12/068,919.
Office Action issued Mar. 17, 2009 by the Japanese Patent Office in counterpart Japanese Patent Application No. 2006-523136.
Office Action for Korean patent application No. 10-2003-0045824 dated Oct. 23, 2009.
Office Action for Japanese patent application No. 2007-046127 dated Sep. 24, 2009.
Office Action for Japanese patent application No. 2006-523133 dated Sep. 4, 2009.
Office Action for Chinese patent application No. 200710162346.1 dated Sep. 4, 2009.
Office Action for Malaysian patent application No. PI 20042673 dated Oct. 30, 2009.
Office Action for Chinese patent application No. 200710162347.6 dated Sep. 4, 2009.
Notice of Allowance issued May 14, 2009 by the Russian Patent Office in counterpart Russian Patent Application No. 2005111867/28.
Office Action issued Sep. 1, 2009 by the Japanese Patent Office in counterpart Japanese Patent Application No. 2007-081296.
Notice of Allowance issued Aug. 24, 2009 by the Russian Patent Office in counterpart Russian Patent Application No. 2007135326/28 (with English language translation).
Notice of Allowance issued Aug. 12, 2009 by the Russian Patent Office in counterpart Russian Patent Application No. 2004122401/28 (English language translation).
"80 mm (1,23 Gbytes per side) and 120 mm (3,95 Gbytes per side) DVD-Recordable Disk (DVD-R)," ECMA Standardizing Information and Communication Systems, Standard ECMA-279, Dec. 1998.
Notice of Allowance issued Apr. 16, 2009 by the Russian Patent Office in counterpart Russian Patent Application No. 2006107926/28 (with English language translation).
Notice of Allowance issued Jun. 8, 2009 by the USPTO in counterpart U.S. Appl. No. 10/880,663.
U.S. Office Action corresponding to U.S. Appl. No. 10/880,663 dated Feb. 21, 2008.
U.S. Office Action corresponding to U.S. Appl. No. 12/068,919 dated Sep. 23, 2008.
U.S. Office Action corresponding to U.S. Appl. No. 10/881,469 dated Jan. 6, 2009.
U.S. Office Action corresponding to U.S. Appl. No. 10/883,797 dated Mar. 13, 2008.
Japanese Office Action corresponding to Japanese Application No. 2006-180280 date Jan. 6, 2009.
Japanese Office Action corresponding to Japanese Application No. 2006-187883 date Dec. 26, 2008.
Office Action for Taiwanese patent application No. 95121964 dated Nov. 3, 2009.
Office Action for Chinese patent application No. 200480000820.5 dated Nov. 20, 2009.
Office Action for USPTO U.S. Appl. No. 11/812,798 dated Dec. 4, 2009.
Office Action for Taiwanese patent application no. 093124591 dated Nov. 27, 2009.

* cited by examiner

- ISA : Inner Spare Area
- OSA : Outer Spare Area
- PIC : Permanent Information & Control data
- TDMA : Temporary Defect Management Area

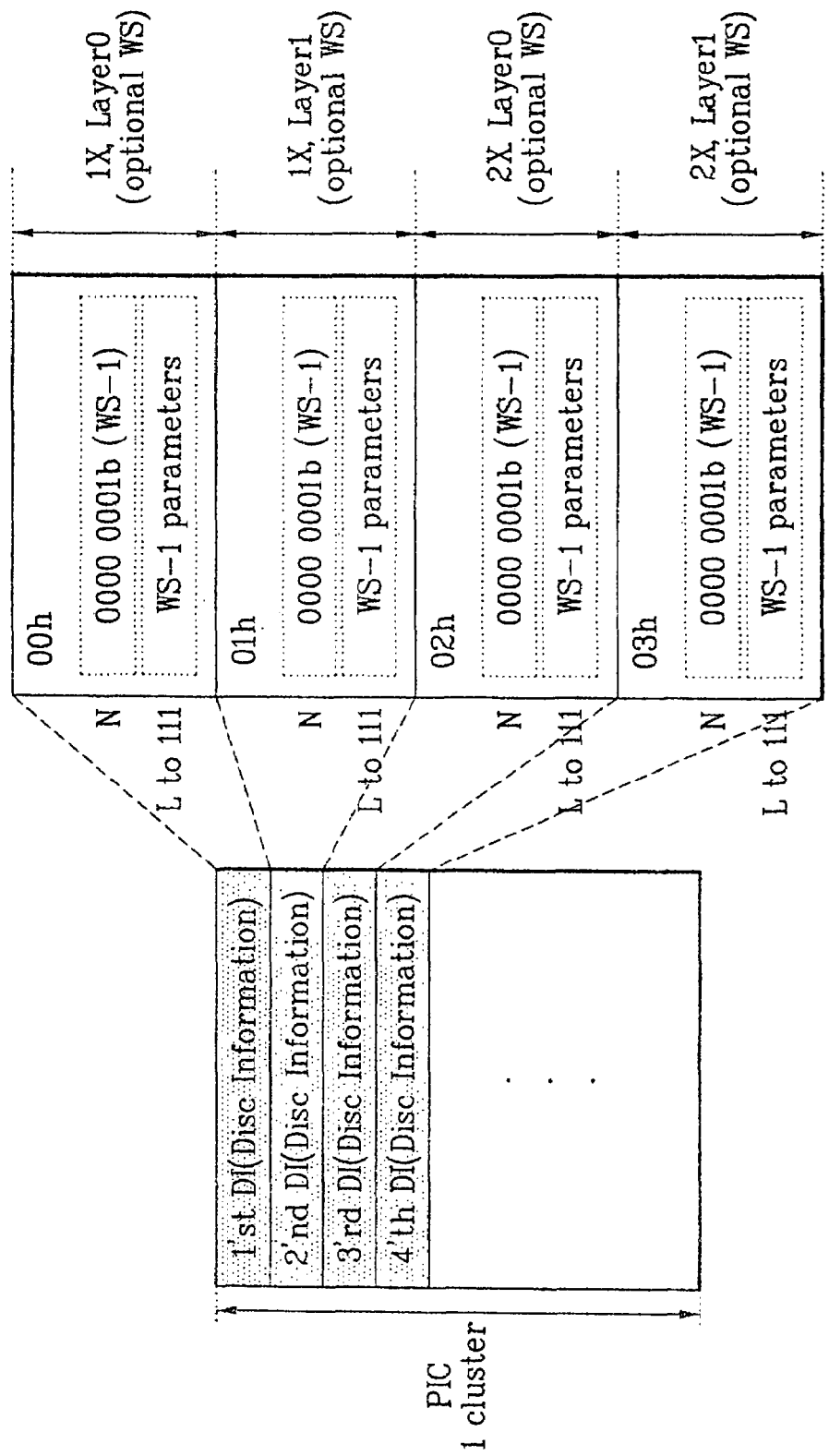

FIG. 7A

Disc Information (112 bytes)

| Byte number | contents | Number of bytes |
|---|---|---|
| 0 | Disc Information identifier = "DI" | 2 |
| 5 | DI frame sequence number in DI block | 1 |
| ... | ... | ... |
| N | Write Strategy (WS) Type | 1 |
| M | Writing speed flag (= 0000 0111b) | 1 |
| K | Write Strategy (WS) flag (= 0000 1111b) | 1 |
| L | Number of Recording Layer (= 0000 0010b : 2 layers) | 1 |
| P ~ 111 | Write Strategy (WS) parameters | |

00h : 1 X, L0, WS1
01h : 1 X, L0, WS2
02h : 1 X, L1, WS1
03h : 1 X, L1, WS2
04h : 2 X, L0, WS2
05h : 2 X, L0, WS3
06h : 2 X, L1, WS2
07h : 2 X, L1, WS3
08h : 3rd X, L0, WS3
09h : 3rd X, L0, WS4
10h : 3rd X, L1, WS3
11h : 3rd X, L1, WS4

| b7 | b6 | b5 | b4 | b3 | b2 | b1 | b0 |
|---|---|---|---|---|---|---|---|
| 8th X | 7th X | 6th X | 5th X | 4th X | 3rd X | 2 X | 1 X |
| 0b | 0b | 0b | 0b | 0b | 1b | 1b | 1b |

0b : this speed is not applicable
1b : this speed is applicable

| b7 | b6 | b5 | b4 | b3 | b2 | b1 | b0 |
|---|---|---|---|---|---|---|---|
| WS8 | WS7 | WS6 | WS5 | WS4 | WS3 | WS2 | WS1 |
| 0b | 0b | 0b | 0b | 1b | 1b | 1b | 1b |

0b : this WS-type is not applicable
1b : this WS-type is applicable

FIG. 8

Disc Information (112 bytes)

| Byte number | contents | Number of bytes |
|---|---|---|
| 0 | Disc Information identifier = "DI" | 2 |
| 5 | DI frame sequence number in DI block | 1 |
| ... | ... | ... |
| N | Write strategy (WS) parameters | 1 |
| M | Writing speed flag | 1 |
| K | Write Stategy (WS) flag | 1 |
| L | Number of Recording Layer | 1 |
| Q | Best WS flag in Writing speed | 1 |
| P~111 | Write strategy (WS) parameters | |

| b7 | b6 | b5 | b4 | b3 | b2 | b1 | b0 |
|---|---|---|---|---|---|---|---|
| WS8 | WS7 | WS6 | WS5 | WS4 | WS3 | WS2 | WS1 |
| 0b | 0b | 0b | 0b | 0b | 0b | 1b | 0b |

1b : this WS-type is best

FIG. 9D

| Byte number | contents | Number of bytes |
|---|---|---|
| 0 | Disc Information identifier = "DI" | 2 |
| 5 | DI frame sequence number in DI block | 1 |
| N | DI Type =CLV (0000 0000b) | 1 |
| P | Write Strategy (WS) Type =WS-1 (0000 0001b) | 1 |
| ... | ... | ... |
| L to 111 | Maximum dc read power | |
| | Maximum HF modulated read power | |
| | Write power settings at Recording Velocity | |
| | Tmp write pulse duration | |
| | Ttop first write pulse duration | |
| | dTtop first write pulse start time at Recording Velocity | |
| | Te erase multi-pulse duration | |
| | dTe first erase pulse start time at Recording Velocity | |

00h (Layer0, 1x DI)

Write Strategy Parameters (DI Type = CLV & WS Type = WS-1)

FIG. 9E

| Byte number | contents | Number of bytes |
|---|---|---|
| 0 | Disc Information identifier = "DI" | 2 |
| 5 | DI frame sequence number in DI block | 1 |
| N | DI Type =CLV (0000 0000b) | 1 |
| P | Write Strategy (WS) Type =WS-1 (0000 0001b) | 1 |
| ... | ... | ... |
| L to 111 | Maximum dc read power | |
| | Maximum HF modulated read power | |
| | Write power settings at Recording Velocity | |
| | Tmp write pulse duration | |
| | Ttop first write pulse duration | |
| | dTtop first write pulse start time at Recording Velocity | |
| | Te erase multi-pulse duration | |
| | dTe first erase pulse start time at Recording Velocity | |

00h (Layer0, 1x DI)

Write Strategy Parameters (DI Type = CLV & WS Type = WS-1)

RECORDING MEDIUM, METHOD OF CONFIGURING CONTROL INFORMATION THEREOF, RECORDING AND REPRODUCING METHOD USING THE SAME, AND APPARATUS THEREOF

DOMESTIC PRIORITY

The present invention is a continuation application of U.S. Ser. No. 10/918,397, filed Aug. 16, 2004, now U.S. Pat. No. 7,342,857 the entire contents of which are incorporated by reference herein.

FOREIGN PRIORITY

The present invention claims the benefit of Korean Application No. 10-2003-0056540 filed on Aug. 14, 2003, Korean Application No. 10-2003-0061785 filed on Sep. 4, 2003, Korean Application No. 10-2003-0063591 filed on Sep. 15, 2003, and Korean Application No. 10-2003-0065628 filed on Sep. 22, 2003, the entire contents of which are hereby incorporated by reference.

BACKGROUND OF THE INVENTION

1. Field of the Invention

The present invention relates to recording media, and more particularly, to a method of recording control information on a recordable optical disc including at least one recording layer, in which write strategy information is included within the recorded control information, and to method of recording data using the disc control information recorded in a specific area of the recordable optical disc.

2. Discussion of the Related Art

A high density optical recording medium, known as HD-DVD, is widely used to record and store high-definition video data and high-quality audio data. The Blu-ray disc represents next-generation HD-DVD technology.

Technological specifications are now being established for the global standardization of the Blu-ray disc, including standards are for the write-once Blu-ray disc (BD-WO). Meanwhile, a rewritable Blu-ray disc, known as the 1x-speed BD-RE and now being discussed, should be compatible with BD-RE discs expected to have higher recording velocities, i.e., the 2x-speed BD-RE and beyond. BD-WO specifications for high recording velocity are also in progress. Efficient solutions for coping with the high recording velocity of a high-density optical disc are urgently needed, and the specifications established should ensure mutual compatibility.

SUMMARY OF THE INVENTION

A data structure of a control information for use with a recording medium having multiple recording layers. The control information includes a first information unit for a first recording layer and a second information unit for a second recording layer. The first information unit includes write strategy parameters for the first write strategy type to be used for the first recording layer, and the second information unit includes write strategy parameters for the second write strategy type to be used for the second recording layer. The second write strategy type being the same or different from the first write strategy type.

A method of recording data that includes reading a control information where the control information has a first information unit for a writing speed and a first recording layer and a second information unit for the same writing speed and a second recording layer. The first information unit includes write strategy parameters for the first write strategy type to be used for the writing speed and first recording layer, and second information unit including write strategy parameters for the second write strategy type to be used for the same writing speed and second recording layer. The second write strategy type being the same or different from the first write strategy type. Thereafter, the method calls for recording a main data at the writing speed using the corresponding write strategy parameters to the corresponding recording layer.

A method of recording data that includes reading a control information where the control information has at least a first information unit for a first recording layer and a second information unit for a second recording layer. The first information unit including write strategy parameters for first write strategy type to be used for the first recording layer and the second information unit including write strategy parameters for second write strategy type to be used for the second recording layer. The first write strategy type is one of an n−1 write strategy type and an n/2 write strategy type and the second write strategy type is one of an n−1 write strategy type and an n/2 write strategy type. The first write strategy type being different from the second write strategy type. The variable n is a length of mark and each type represents a number of write pulse to form a corresponding mark. Thereafter, the method calls for recording a main data using write strategy parameters for first or second write strategy types at the corresponding recording layer.

An apparatus for recording data that includes a controller for generating a recording command for a specific recording layer from a multiple layer recording medium and controlling a recording operation. A recorder/reproducer is configured to perform a recording of data, based on the recording command from the controller, by reading a control information. The control information includes a first information unit for a first recording layer and a second information unit for a second recording layer. The first information unit includes write strategy parameters for a first write strategy type to be used for the first recording layer and a second information unit including write strategy parameters for a second write strategy type to be used for the second recording layer. The first write strategy type is one of an n−1 write strategy type and an n/2 write strategy type and the second write strategy type is one of an n−1 write strategy type and an n/2 write strategy type. The first write strategy type being the same or different from the second write strategy type. The variable n is a length of mark and each type represents a number of write pulses to form a corresponding mark. The recorder/reproducer performs the recording of data on the corresponding recording layer using the corresponding write strategy type, according to a control of the controller.

An apparatus for recording data that includes a writing/reading unit to read at least one control information and to record a main data on a specific recording layer from a multiple layer recording medium. The control information includes a first information unit for a writing speed and a first recording layer and a second information unit for the same writing speed and a second recording layer. The first information unit includes write strategy parameters for a first write strategy type to be used for the writing speed and the first recording layer, and the second information unit including write strategy parameters for a second write strategy type to be used for the same writing speed and the second recording layer. The second write strategy type being different from the first write strategy type. Each write strategy type being one an n−1 write strategy type and an n/2 write strategy type. The variable n is a length of mark and each type represents a number of write pulse to form a corresponding mark. A controller configured to control the writing/reading unit to record the main data on each recording layer based on first and second write strategy type, wherein the controller determines a specific write strategy type to record the main data on the corresponding recording layer and applies the determined write strategy type applicable to the corresponding recording layer.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4A-4E are diagrams of a sample data structure of disc control information recorded according to a first embodiment of the present invention;

FIG. 6, FIGS. 7A & 7B, and FIG. 8 are diagrams of a sample data structure of disc control information recorded according to a third embodiment of the present invention;

FIG. 9A-9E are diagrams of t sample data structure of disc control information recorded according to a fourth embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. For convenience of explanation, a Blu-ray disc (BD) is taken as an example of an optical disc according to the present invention. Yet, it is apparent that the concept of the present invention, which is characterized in an optical disc having its disc control information recorded thereon, is applicable to DVD-RAM/-RW/+RW/-R/+R and the like for example in the same manner.

Besides, although terms used in the present invention are possibly selected from the currently well-known ones, some terms are arbitrarily chosen by the applicant in some cases so that their meanings are explained in detail in the following description. Hence, the present invention should be understood with the intended meanings of the corresponding terms chosen by the applicant instead of the simple names or meanings of the terms themselves.

First of all, 'disc control information' in the description of the present invention means an area including various information for disc record playback or information for disc record playback. And, the disc control information is commonly designated information provided to a prerecorded area within a disc or to an embossed area for a disc user by a disc manufacturer. Yet, the disc control information is provided not only to the prerecorded area but also to a recordable area. The disc information within the prerecorded or embossed area can be copied to the recordable area as well. And, they are just exemplary.

For instance, the disc control information is called 'disc information' in BD or 'physical format information' in DVD-RAM/-RW/+RW/-R/+R. Hence, it is apparent that the technical background of the present invention is identically applicable to 'physical format information' in DVD-RAM/-RW/+RW/-R/+R. For convenience of explanation, 'disc information (hereinafter abbreviated DI)' corresponding to a case of Blu-ray disc (BD) is taken as an example.

Figure 1:
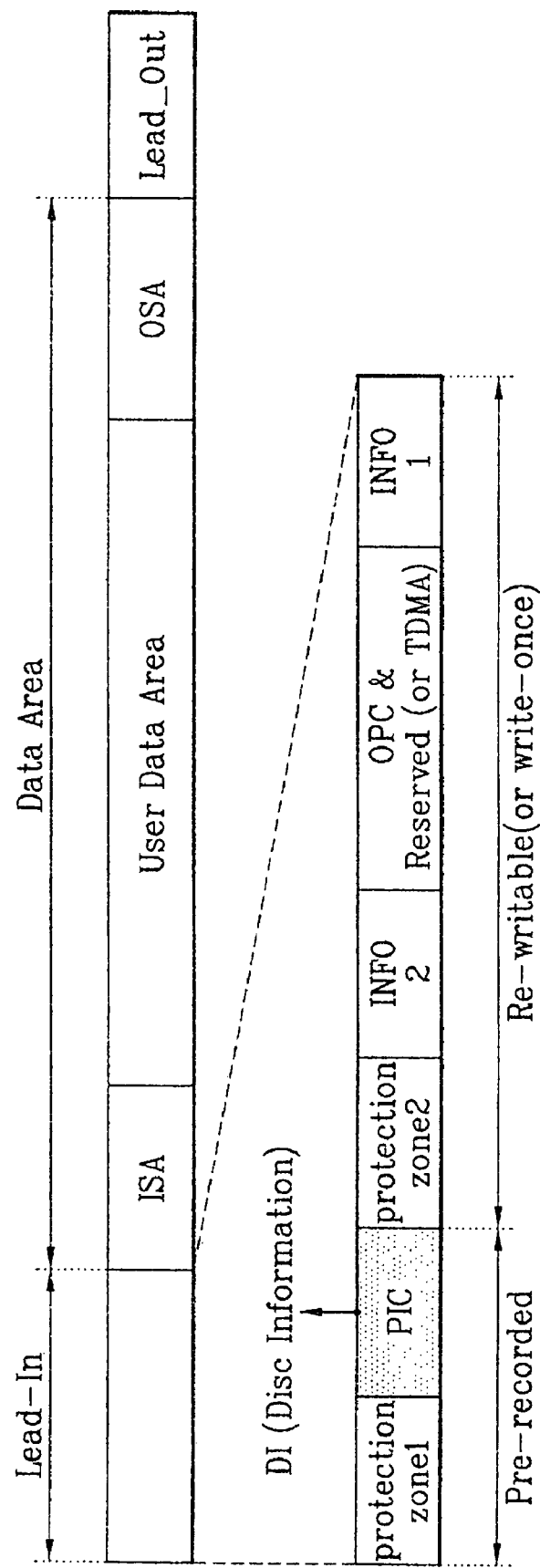
FIG. 1 is a diagram of a single-layer disc applicable to the present invention.
Figure 2:
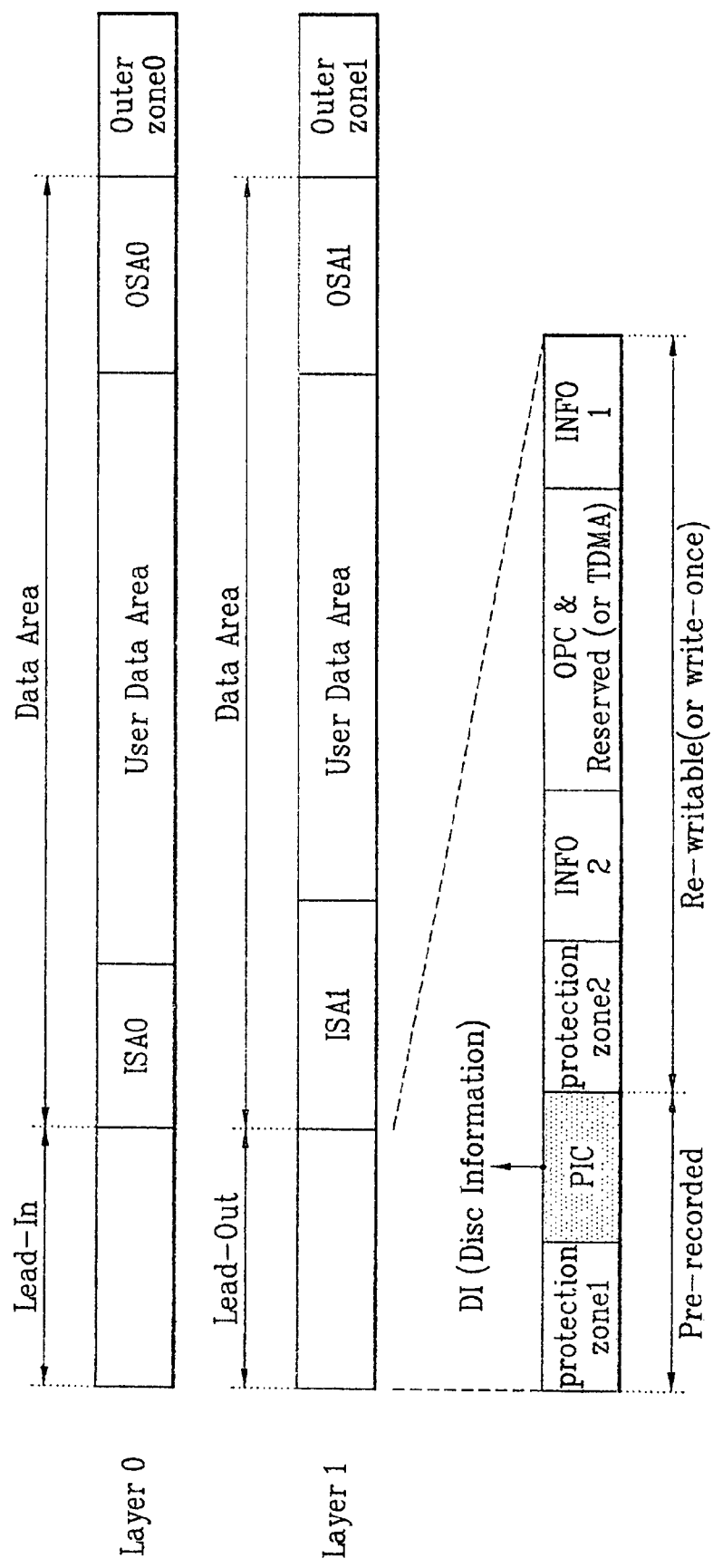
FIG. 2 is a diagram of a dual-layer disc applicable to the present invention.

FIG. 1 and FIG. 2 are structural diagrams of optical discs according to the present invention, in which a recordable optical disc is enough to be the optical disc applicable to the present invention. Moreover, the recordable disc can be any one of a rewritable optical disc, a write-once optical disc, and the like.

FIG. 1 is a structural diagram of a single-layer disc having one recording layer according to the present invention.

Referring to FIG. 1, a lead-in area is provided as a management area on an inner circumference area of an optical disc, whereas a lead-out area is provided as a management area on an outer circumference area of the optical disc. Specifically, a prerecorded area and a rewritable or write-once area are separated from each other within the inner circumference area of the disc.

The prerecorded area is an area (called 'embossed area') where data was already written in manufacturing the disc, whereby a user or system is unable to perform data writing on the prerecorded area at all. In BD-RE/WO, the prerecorded area is named PIC (permanent information and control data) area. And, the above-described disc information (hereinafter called 'DI') as information required for disc recording is recorded in the PIC area.

In a data area, provided are a user data area where user's real data is recorded and spare areas ISA and OSA to replace a generated defect area. Specifically, TDMA (temporary defect management area) for recording information of defect and general managements is provided to such a write-once optical disc as BD-WO. In case of the re-writable BD (BD-RE), TDMA is unnecessary so that such an area is left as a reserved area.

The present invention intends to provide a method of efficiently recording disc information (DI) as disc control information required for record playback of a disc in the prerecorded or recordable area. It is apparent that a recording method in the prerecorded area is differently applied to each kind of discs. In case of BD-RE/WO, the PIC area as the prerecorded area is recorded by biphased high frequency modulated signals, the high frequency modulated signals in the corresponding area are played back according to a specific playback method, and information is acquired from the playback.

FIG. 2 is a diagram of a dual-layer disc having dual recording layers, in which a recording layer starting with a lead-in is named a first recording layer Layer0 and a recording layer ending with a lead-out is named a second recording layer Layer1.

In the dual-layer disc, the PIC area is provided to lead-in and lead-out areas of a disc inner circumference area, and disc information (DI) of the same contents is recorded in the PIC area.

Figure 3:
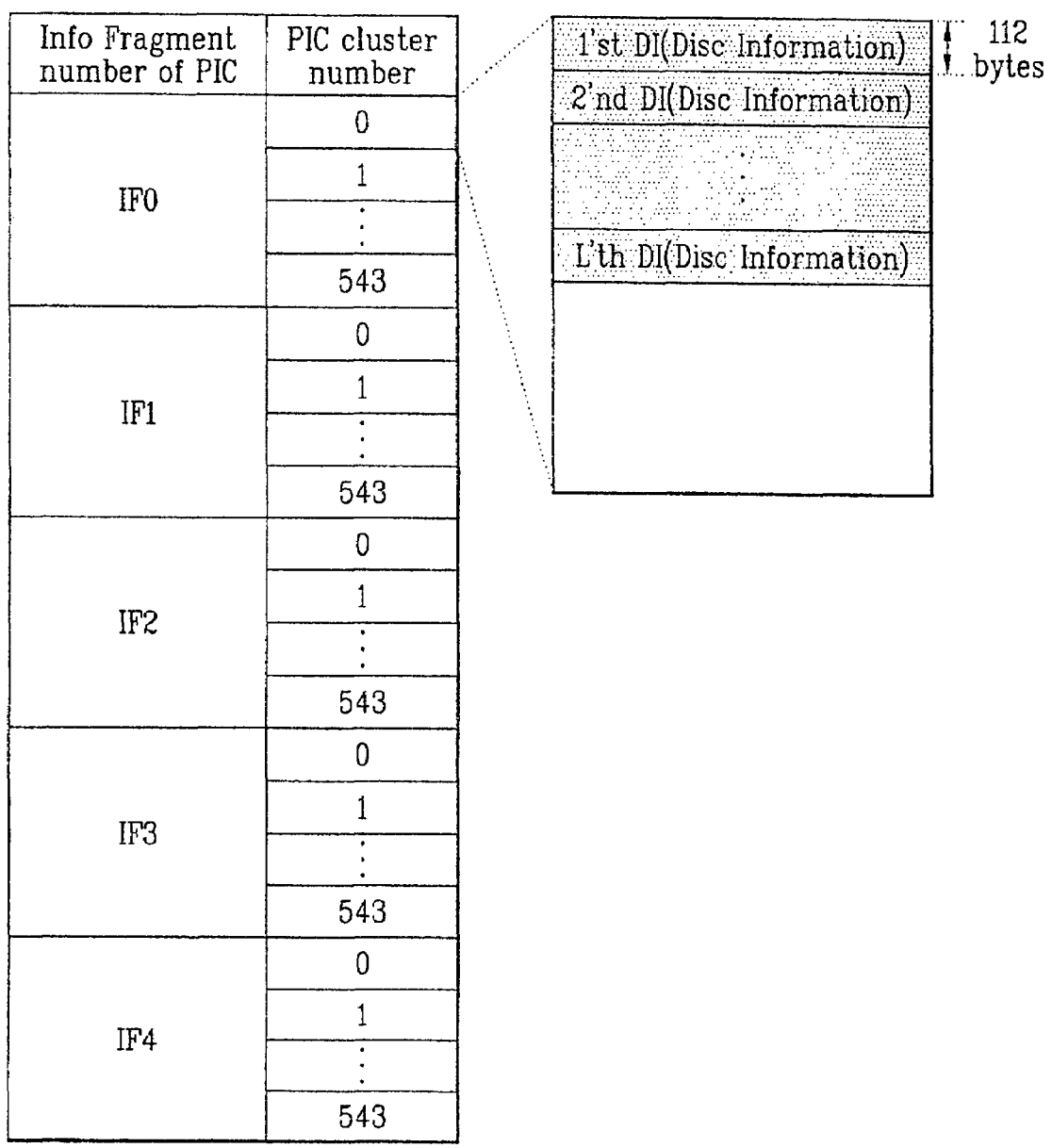
FIG. 3 is a diagram of a management area where disc control information of the present invention is recorded, illustrating a disc information recording format.

FIG. 3 is a structural diagram of a PIC area in the disc shown in FIG. 1 or FIG. 2. As mentioned in the foregoing description, it means that information can be rearranged like the structure of the PIC area in FIG. 3 when the entire information within the high frequency modulated PIC area is acquired.

A method of configuring disc information (DI) in the PIC area is explained in detail as follows.

In BD-RE/WO, 'one cluster' represents a minimum record unit, five hundred forty-four clusters gather to construct one fragment as one upper record unit, and total five fragments gather to form the PIC area. Disc information is recorded in a front head cluster of a first fragment IF0. The disc information is plurally recorded per recording layer and writing speed permitted by the corresponding optical disc, and one disc information includes one hundred twelve bytes. Specifically, disc information constructed with 112-bytes is called disc information (DI) frame. Moreover, the same contents of the disc information are repeatedly recorded in each front head cluster of the rest of the fragments, thereby enabling to cope with loss of the disc information.

Information representing the corresponding recording layer, information representing writing speed, and write strategy information corresponding to the writing speed are recorded within each disc information. Hence, such information is utilized in record playback of the corresponding optical disc, thereby enabling to provide optimal write power per recording layer and per writing speed.

Namely, the disc information (DI) of the present invention is characterized in providing specific writing speed information supported by the corresponding disc and associated write strategy information, and more specifically, in providing specific writing speed supported for each recording layer and associated write strategy information via a specified method in case that a plurality of recording layers exist in the corresponding disc.

And, the specific configuration of the disc information (DI) relates to that of Blu-ray disc (BD). It is also apparent that a DVD based disc may have a configuration different from the above-explained structure. Specifically, if a size of disc information (DI) corresponds to that of BD, it is 112 bytes equivalently for example. Yet, by regarding disc information (DI) of the same recording layer as one information to provide once without repeating common information, it may be able to configure the write strategy differing per writing speed only in addition.

Various embodiments for a method of configuring disc information and a method of recording specific information and the like within disc information according to the present invention are explained in detail by referring to the attached drawings as follows.

FIGS. 4A to 4E are diagrams of recording disc information of an optical disc according to a first embodiment of the present invention, in which one of a plurality of write strategy (WS) types defined by a specification is recorded on a corresponding disc information.

Figure 4A:
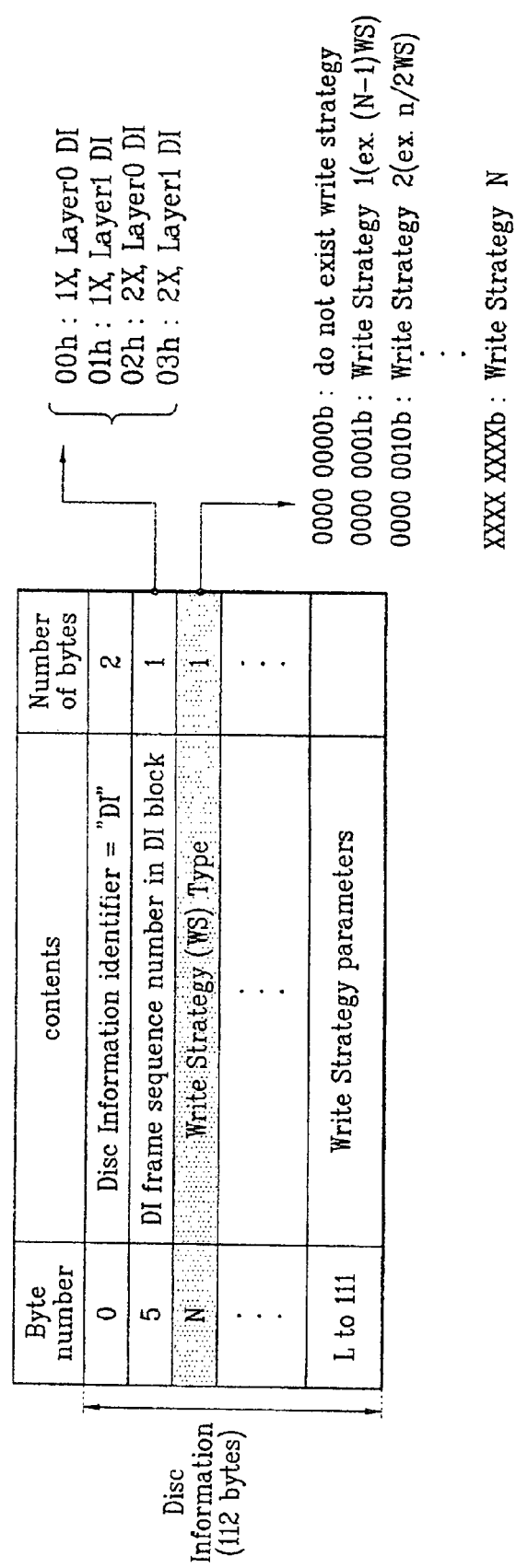

FIG. 4A shows a concept of recording disc information of an optical disc according to a first embodiment of the present invention.

Referring to FIG. 4A, a plurality of disc informations are recorded within a disc, a record sequence of each disc information is decided by a sequence number, and the record sequence is recorded by 1-byte. For instance, the corresponding information is recorded in $5^{th}$ byte within the disc information, which is named 'DI frame sequence number in DI block' field and is briefly indicated by '00h, 01h, 02h, 03h . . . '.

Namely, the information of the $5^{th}$ byte is defined in a following manner. First of all, if the information of the $5^{th}$ byte is '00h', '00h' means $1^{st}$ disc information as well as disc information of 1× speed of a first recording layer Layer0. '01h' means $2^{nd}$ disc information as well as disc information of 1× speed of a second recording layer Layer1. '02h' means $3^{rd}$ disc information as well as disc information of 2× speed of the first recording layer Layer0. And, '03h' means $4^{th}$ disc information as well as disc information of 2× speed of the second recording layer Layer1.

Hence, the disc information is preferentially arranged in a recording velocity order and is then configured in a per recording layer order. Yet, this is just exemplary. On the contrary, the recording layer order can be preferred to the recording velocity order in configuring disc informations.

Moreover, write strategy (WS) interoperating with recording velocity meant by the corresponding disc information is recorded in a specific area, e.g., area named 'Write Strategy parameters' field as $L^{th}$~$111^{th}$ bytes, within the disc information. And, identification information enabling to identify a type or kind of the recorded write strategy (WS) recorded in the $L^{th}$~$111^{th}$ bytes is recorded in another specific area, e.g., area named 'Write Strategy type' field as $N^{th}$ byte, within the disc information.

Considering the meaning of 'write strategy (WS)', a medium property of a recording layer is generally modified by applying a laser beam to the recording layer within an optical disc via a pickup ('11' in FIG. 10) to perform a recording thereof. Hence, it should be decided a strength (write power) of the laser beam, write pulse, a time of applying the write power thereto, and the like. The above-decided various kinds of write strategies are named 'Write Strategy (WS)' in general and specific contents recorded within a specific 'Write Strategy (WS)' are named 'Write Strategy (WS) parameters'.

Write strategy (WS) information used in the present invention means the entire information associated with write strategy (WS). And, WS parameters means items and specific numeric values configuring WS and is a sort of WS information. Hence, the WS information has an inclusive concept of including the above-described 'WS Type', 'WS flag' that will be explained later, and the like as well as the WS parameters.

And, the write strategy (WS) can be recorded in various ways. As a disc becomes to be highly densified and to run at higher speed, a writing speed, i.e., disc RPM) as well as the medium property of the recording layer is considerably affected. Hence, a more accurate system is requested. And, the various write strategies (WS), i.e., WS types are explained as follows for example.

First of all, there is a system having a number of recording pulse smaller by 1 than a recording mark size (n) formed on a recording layer medium, which may be called '(n−1) WS'. For example, if a mark has a length 7T, it requires 6 pluses to form the 7T according to the (n−1)WS. In that case, a time of each write pulse or a level of write power is defined by the write strategy parameters recorded in the corresponding disc information. Secondly, there is a system having a number of recording pulse having a size amounting to a half of the recording mark size (n), which may be called 'n/2 WS'. For example, if a mark has a length 7T, it requires 3 pluses to form the 7T according to the (n−1)WS. That is, a decimal fraction of the result is discarded and the integer numbers of pluses are only available. In that case, a time of each write pulse or a level of write power is defined by the write strategy parameters recorded in the corresponding disc information. The respective write strategy parameters for each write strategy type may have different values each other. Besides, new write strategies (WS) keep being developed. Regarding the different kinds of write strategy (WS), when there exist the various systems of the write strategy (WS) exist as parameters applied to the write strategies (WS) differ from each other, a disc manufacturer tests the write power according to the write strategy (WS) and then records a result of the test in 'WS parameters' field of the $L^{th}$~$111^{th}$ bytes within the disc information and WS type information in $N^{th}$ byte.

If there exist N-types of write strategies (WS), the identification information allocates a specific recognition value to each write strategy (WS) to define as follows. For instance, '0000 0001b' means $1^{st}$ WS (Write Strategy-1 or WS-1). '0000 0010b' means $2^{nd}$ WS (Write Strategy-2 or WS-2). 'XXXX XXXXb' means $N^{th}$ WS (Write Strategy-N or WS-N).

In the present invention, $1^{st}$ WS (WS-1) is defined by the above-explained '(n−1) WS' and $2^{nd}$ WS (WS-1) is defined by '(n/2) WS'.

Moreover, if the 'WS Type' field is set to '0000 0000b', it can be defined to mean that a specific WS type fails to exist as well as WS parameters within disc information. Namely, the 'WS Type' field of the $N^{th}$ byte can be utilized as information indicating that there exists no WS parameters as well as information designating the WS type.

Figure 4B:
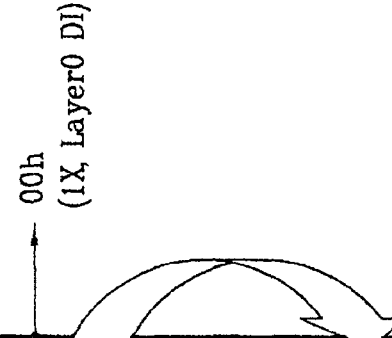

FIG. 4B shows an example of recording disc information for a specific write strategy (WS), in which a disc manufacturer selects to record $1^{st}$ WS (WS-1) from various specifications in recording a write strategy (WS) for 1× speed within 1× speed disc information of a first recording layer.

Namely, if 'WS Type' field of $N^{th}$ byte of disc information is '000 0001b' means $1^{st}$ WS (WS-1), parameter values corresponding to the WS-1 are written in 'Write Strategy parameters' field of $L^{th}$~$111^{th}$ bytes.

Hence, in case that a disc manufacturer selects to record $2^{nd}$ WS (WS-2), '0000 0010b' is written in the 'Write Strategy Type' field and parameters fitting the $2^{nd}$ WS will be written in the $L^{th}$~$111^{th}$ bytes. The parameters written in the $L^{th}$~$111^{th}$ bytes have different values from each other according to the write strategy (WS) type. And, the corresponding write strategy (WS) parameters are previously determined as specified information fitting the characteristics of the disc and will be provided to a disc manufacturer or a system designer.

Figure 4C:
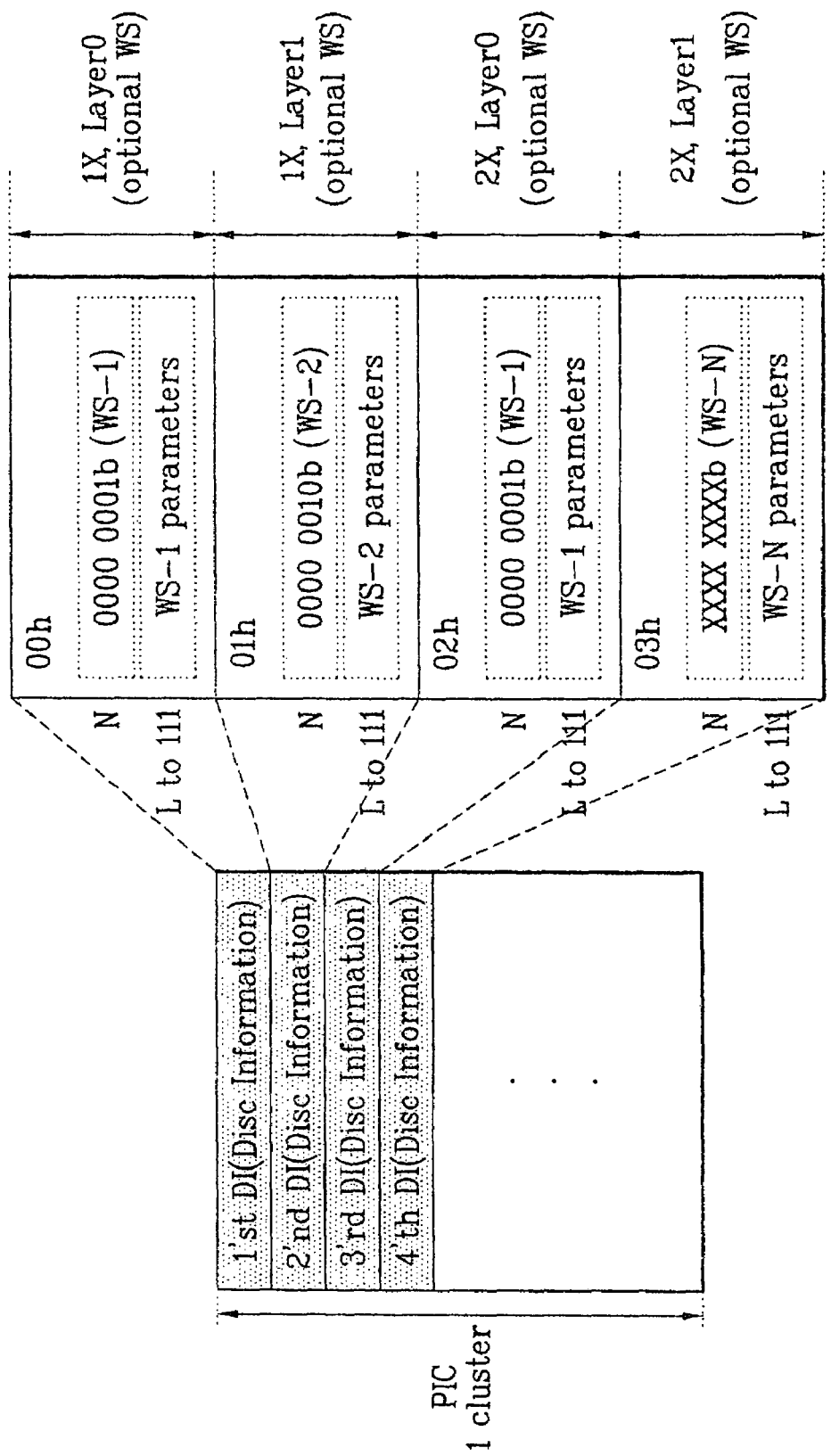
Figure 4E:
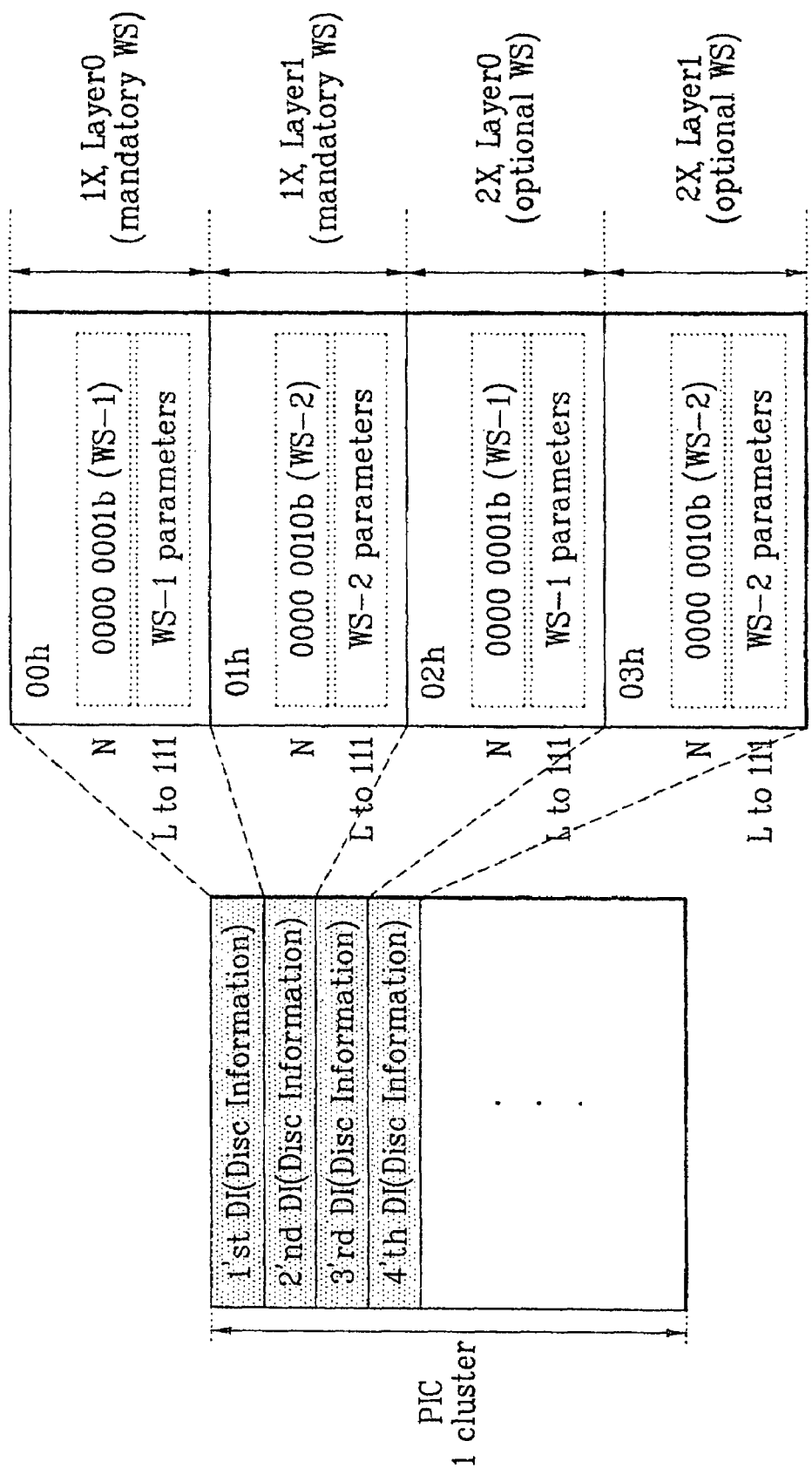

FIGS. 4C to 4E show specific embodiments for a method of recording the above-defined write strategy (WS) within disc information. FIG. 4C and FIG. 4D show the method that the write strategy (WS) is optionally selected to be recorded for the entire recording layers and recording velocities on manufacturing a disc. And, FIG. 4E shows a method of recording a previously determined write strategy (WS) in a mandatory manner in case of a specific recording velocity.

For convenience of explanation, it is assumed that a disc includes a dual layer and that 1× speed (1×) and 2× speed (2×) are applied to each recording layer.

FIG. 4C shows a case of enabling to optionally different record write strategies (WS) in the entire recording layers and at the entire recording velocities. For instance, disc information of 1× speed of a first recording layer Layer0 is recorded in '00h' as a disc information sequence and $1^{st}$ WS (WS-1) is selected to be recorded as a write strategy (WS). Disc information of 1× speed of a second recording layer Layer1 is recorded in '01h' and $2^{nd}$ WS (WS-2) is selected to be recorded as a write strategy (WS). Disc information of 2× speed of the first recording layer Layer0 is recorded in '02h' and I" WS (WS-1) is selected to be recorded as a write strategy (WS). And, disc information of 2× speed of the second recording layer Layer1 is recorded in '03h' and $N^{th}$ WS (WS-N) is selected to be recorded as a write strategy (WS). In such a case, write strategy parameters for $1^{st}$ WS (WS-1), e.g., (n−1) write strategy type, to be used for 1× speed of a first recording layer (Layer 0) may have different values from that to be used for 2× speed of the a first recording layer (Layer 0).

FIG. 4D shows another example of enabling to optionally record a write strategy (WS), in which the same type of write strategy (WS) is applied to disc information of the entire recording layers and recording velocities. In such a case, write strategy parameters for specific recording layer and/or writing speed may have different values from that for other recording layer and/or writing speed respectively.

Namely, since it is able to record a write strategy optionally, a disc manufacturer enables to apply one most reliable write strategy (WS) to the entire disc information identically. And, FIG. 4D illustrates a case that $1^{st}$ WS (WS-1) is recorded in the entire disc information.

FIG. 4E shows a method of recording a write strategy (WS) previously determined in a mandatory manner in case of a specific recording velocity or a write strategy (WS) optionally in case of a rest recording velocity. Generally, write strategy (WS) for 1× speed is the most important write strategy of which specific method is previously decided by a specified decision and a disc manufacturer enables to optionally record the rest recording velocities except the 1× speed. Yet, in case of a high-speed disc, it is apparent that the recording velocity decided in a mandatory manner can be 2× speed, 3× speed, or the like as well as 1× speed.

For instance, if a type of a write strategy (WS) mandatory for the 1× speed is $1^{st}$ WS (WS-1), disc information for 1× speed of a first recording layer is written in '00h' and '01h' as a disc information sequence and the $1^{st}$ WS (WS-1) should be written as the write strategy (WS) in a mandatory manner. Disc information for 2× speed of the first recording layer is written in '02h' and '03h' and $2^{nd}$ WS (WS-2) is selected to be recorded as the write strategy (WS) that can be optionally recorded. Hence, if the write strategy (WS) type mandatory for 1× speed is the $2^{nd}$ WS (WS-2), it is apparent that the $2^{nd}$ WS (WS-2) should be recorded in a mandatory manner as well as '00h' and '01h' as the disc information sequence record the disc information of 1× speed therein.

In applying the case of FIG. 4E, one of a plurality of specified write strategies is uniformly written as the 1× speed write strategy (WS) in a mandatory manner, thereby enabling to secure more disc recording characteristics. And, a disc manufacturer enables to optionally record one of a plurality of the specified write strategies uniformly for the rest recording velocities except the 1× speed, whereby a disc manufacturing process time can be shortened.

Besides, in specific case of FIG. 4E, it is also able to record the mandatory write strategy (WS) for 1× speed as well as a disc manufacturer enables to optionally record other write strategy (WS) for 1× speed separately. In such a case, the disc information for 1× speed can include disc information including the specified mandatory write strategy (WS) and different disc information including the optional write strategy (WS). This will be explained in the description of a third embodiment of the present invention in detail later.

Figure 5A:
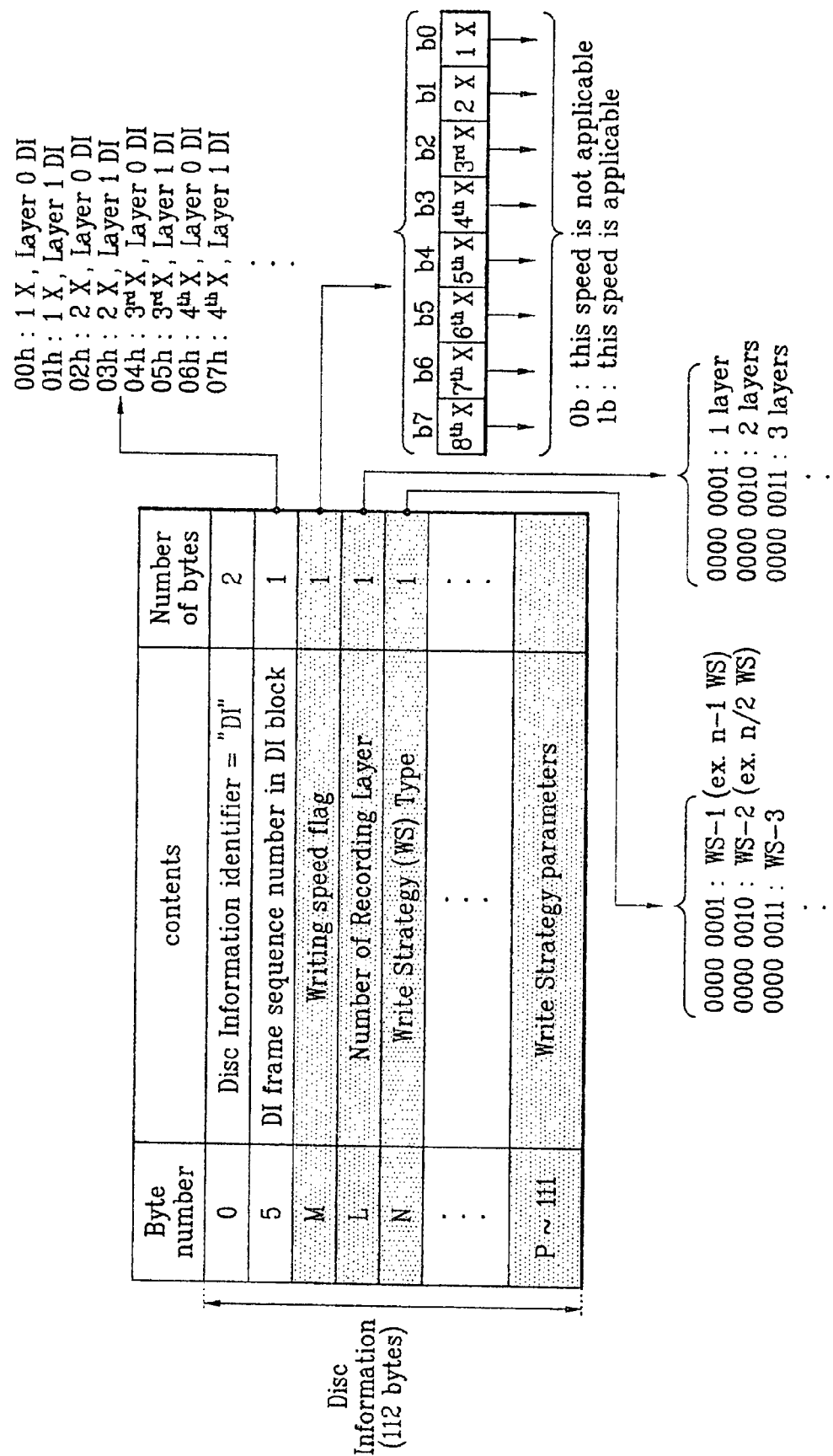
FIGS. 5A-5C are diagrams of a sample data structure of disc control information recorded according to a second embodiment of the present invention.
Figure 5B:
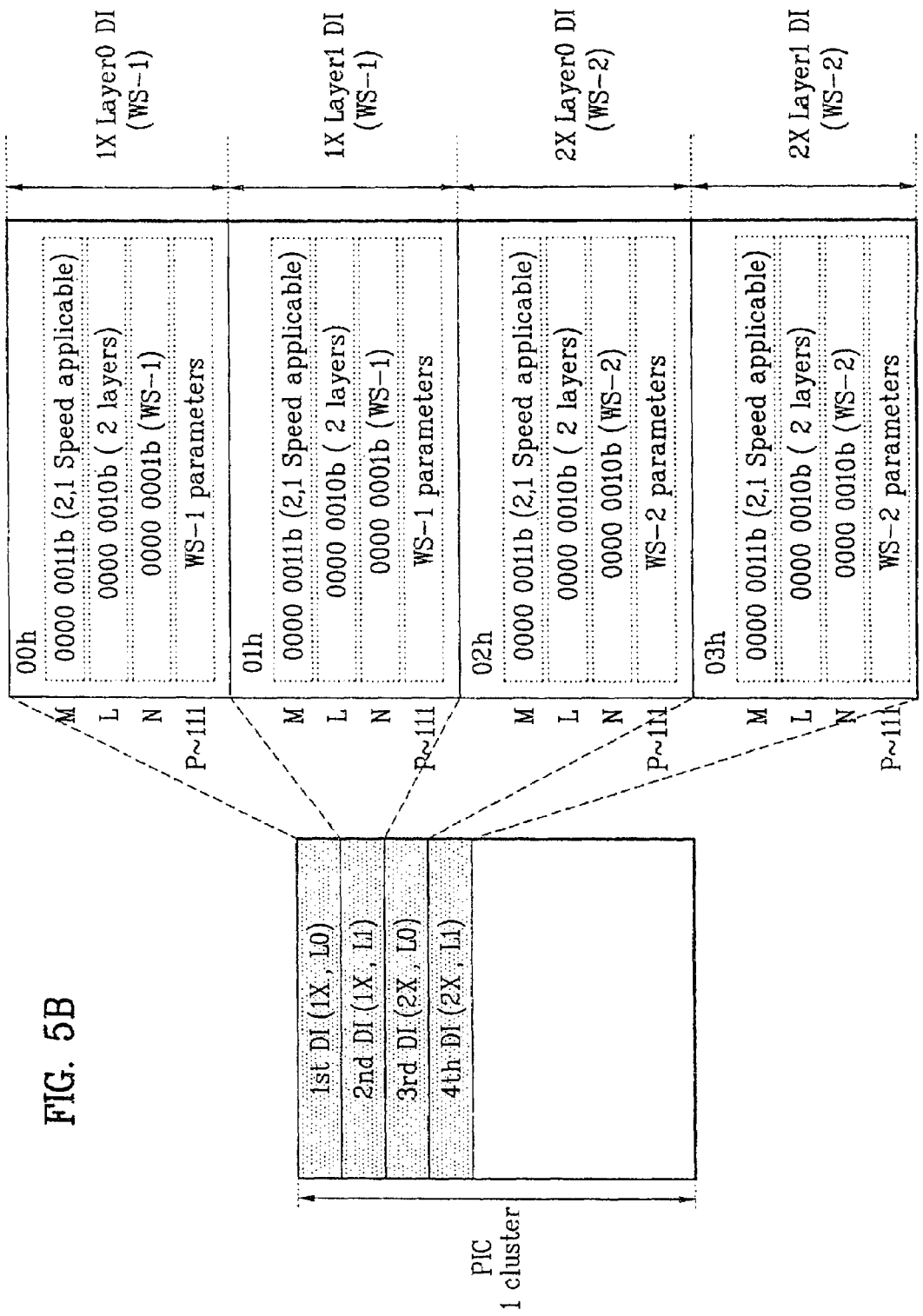
Figure 5C:
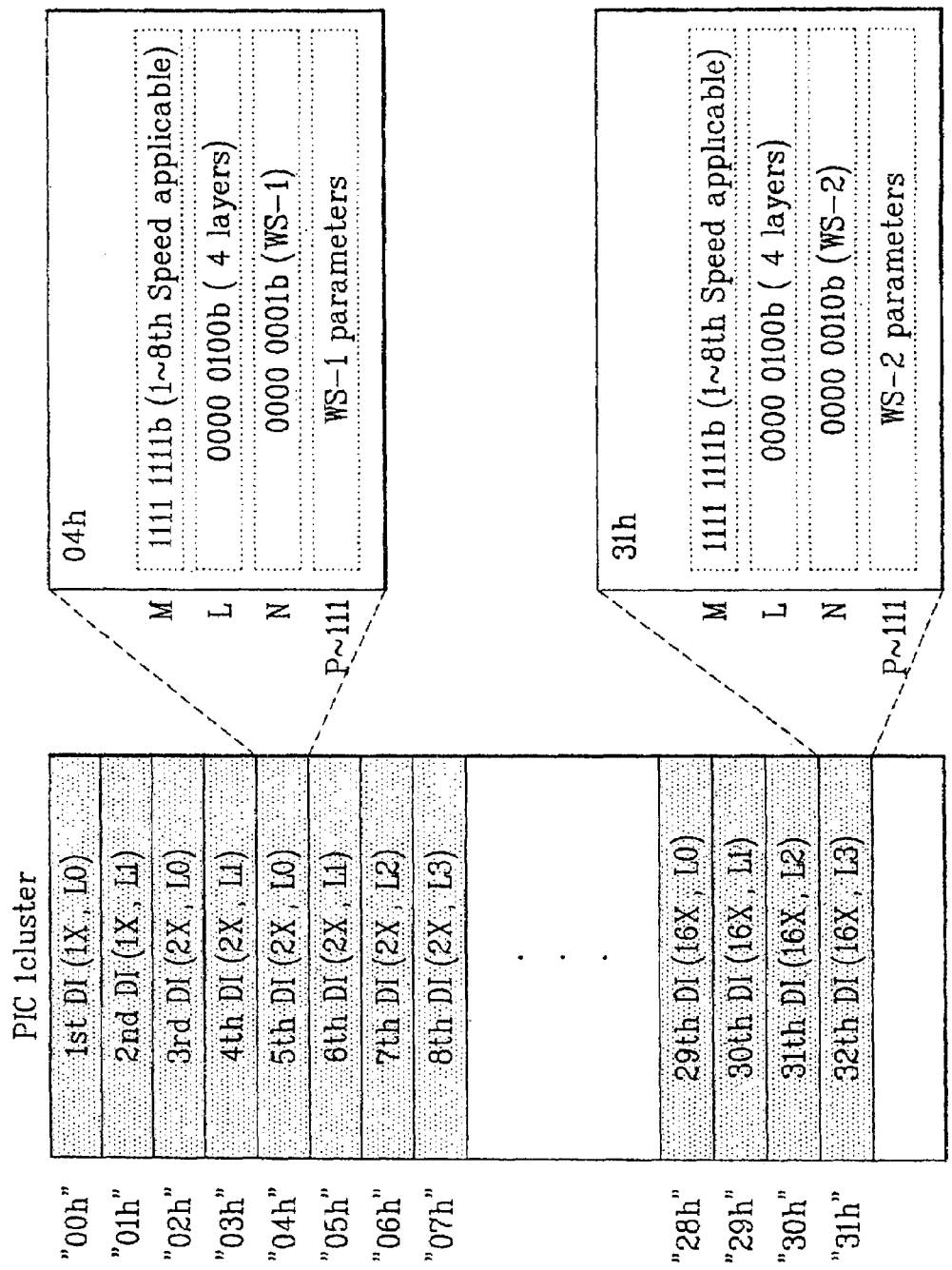

FIGS. 5A to 5C are diagrams of an another example of recording disc information according to a second embodiment of the present invention, in which 'applicable writing speed information' and 'recording layer information existing within disc' are recorded within the corresponding disc information as well as one of a plurality types of write strategies (WS) defined by a specification.

Referring to FIG. 5A, 'DI frame sequence number in DI block' is provided to $5^{th}$ byte of each disc information to mean a sequence, which means that disc informations are configured in a specific sequence in the same manner of FIG. 4A. And, 'Write Strategy Type (WS)' field is provided to a specific area ($N^{th}$ byte) within disc information to record a type of WS applied to the corresponding disc information.

Besides, writing speed information applicable by a corresponding disc is recorded within a specific area ($M^{th}$ byte) within disc information, which is named 'Writing speed flag' field.

For instance, whether a specific writing speed of eight kinds of writing speeds is applicable by the corresponding disc is represented by 1-bit each in the same area having 1-byte allocated thereto. Namely, it can be defined that the corresponding writing speed is not applicable (supported) if a bit value is '0b' in entire bits or that the corresponding writing speed is applicable (supported) if the bit value is '1b'. Hence, each of the bits b0~b7 within 1-byte becomes flag information indicating presence or non-presence of applicability of a specific writing speed.

For instance, if 1× speed is applicable by a corresponding disc only, '0000 0001' is written in $N^{th}$ byte. If all of the eight kinds of writing speeds are applicable, '1111 1111' is written in the $N^{th}$ byte.

In the above explanation, 1× and 2× speeds utilized by every disc almost are previously decided to be adopted. Yet, writing speeds decided by specification can be used as the rest writing speeds from $3^{rd}$ writing speed. For instance, it is possible to set $3^{rd}$, $4^{th}$, $5^{th}$, $6^{th}$ $7^{th}$, and $8^{th}$ writing speeds ($3^{rd}×$, $4^{th}×$, $5^{th}×$, $6^{th}×$, $7^{th}×$, $8^{th}×$) to 5×, 6×, 8×, 12×, 14×, and 16× speeds, respectively.

Meanwhile, recording layer information indicating the number of recording layer(s) existing within the corresponding disc is recorded in another specific area ($L^{th}$ byte) within the disc information, which is named 'Number of Recording Layer' field. For instance, a value meaning the number of the recording layer(s) can be represented by a binary number in the same area having 1-byte allocated thereto. In case that the recording layer is the single layer in FIG. 1, '0000 0001' is written in the $L^{th}$ byte. In case that the recording layer is the dual layer in FIG. 2, '0000 0010' is written in the $L^{th}$ byte. In case that four recording layers exist, '0000 0100' is written in the $L^{th}$ byte.

Since limitation is put on the number of the currently considered recording layer(s), which is currently two recording layers, 4-bits within the $L^{th}$ byte are enough to represent total fifteen recording layers (in case of '1111'). In such a case, it is apparent that other valid information can be written in the rest area (4-bits) of the $L^{th}$ byte.

Moreover, a specific 'Write Strategy (WS) parameters' field interoperating with a 'Write Strategy (WS) Type' field value of the $N^{th}$ byte is provided to another specific area ($P^{th}$~$111^{th}$ bytes) to record associated information therein.

Thus, from the above-recorded 'writing speed information' in the $M^{th}$ byte and the 'recording layer information' in the $L^{th}$ byte, a record playback apparatus (FIG. 9) recognizes how many disc informations exist within the corresponding disc. Namely, the number of the existing disc informations is found by multiplying an applicable writing speed number by the number of recording layers.

As the present invention applies one write strategy (WS) to a specific writing speed and a specific recording layer, the kind (type) and number of the write strategy (WS) may not be taken into consideration in deciding the number of disc information(s). Yet, in a third embodiment of the present invention (FIG. 6~FIG. 8), it will be described that a plurality of write strategies (WS) can exist for a specific writing speed and a specific recording layer. In such a case, the total number of the existing disc informations is not always found by multiplying an applicable writing speed number by the number of recording layers. This will be explained in detail later in FIG. 6.

Hence, a sequence of a plurality of the above-decided disc informations is decided by the sequence numbers, which is written in the $5^{th}$ byte in the foregoing description, and each of the disc informations designates the previously decided writing speed and recording layer by the sequence.

For example, by knowing that four writing speeds applicable by a disc exist if the $N^{th}$ byte is '0000 1111' and that two recording layers exist within the disc if the $L^{th}$ byte is '0000 0010', total eight disc informations are needed so that the sequence will be '00h~07h'. And, it is previously decided that disc informations of '00h', '01h', '02h', '03h', '04h', '05h', '06h', and '07h' relate to '1× speed, $1^{st}$ recording layer', '1× speed, $2^{nd}$ recording layer', '2× speed, $1^{st}$ recording layer', '2× speed, $2^{nd}$ recording layer', '3rd writing speed, $1^{st}$ recording layer', '$3^{rd}$ writing speed, $2^{nd}$ recording layer', '$4^{th}$ writing speed, $1^{st}$ recording layer', and '$4^{th}$ writing speed, $2^{nd}$ recording layer'.

Hence, in order to acquire the disc information for a specific target writing speed and a specific target recording layer, the record playback apparatus (FIG. 10) is facilitated to check which disc information is related to the specific target writing speed and recording layer from 'writing speed information' of the $N^{th}$ byte and 'recording layer information' of the $L^{th}$ byte commonly recorded within the respective disc informations instead of playing back to check the entire disc informations.

FIG. 5B shows an example of recording disc information according to the second embodiment of the present invention in FIG. 5A. It can be known that there are two (1×, 2×) applicable writing speeds from $M^{th}$ byte ('0000 0011b') commonly recorded in the entire disc informations and that two recording layers exist within a disc from $L^{th}$ byte ('0000 0010b').

Hence, in the example of FIG. 5B, total four disc informations (two recording layers*two writing speeds) exist and a sequence of the disc informations becomes '00h' (1×,L0)→'01h' (1×,L1)→'02h' (2×,L0)→'03h' (2×,L1). This is done by a specified content according to a predetermined sequence. Thus, the entire disc informations should be configured according to the above manner to enable reciprocal compatibility for utilization.

An intrinsic write strategy (WS) is recorded within each disc information. Specifically, information of a type of a write strategy (WS) written in $P^{th}$~$111^{th}$ bytes within the corresponding disc information is recorded in $N^{th}$ byte. Namely, informations in the $N^{th}$ and $P^{th}$~$111^{th}$ bytes can differ in each disc information, which means that a disc manufacturer enables to optionally record one of a plurality of WSs.

In the example in FIG. 5B, '00h' (1×,L0) and '01h' (1×,L1) relate to the application of a first type write strategy (WS-1) and '02h' (2×,L0) and '03h' (2×,L1) relate to the application of a second type write strategy (WS-2).

FIG. 5C shows another example of recording disc information according to the second embodiment of the present invention in FIG. 5A. It can be known that there are eight (1×, 2×, . . . , 16×) applicable writing speeds from $M^{th}$ byte ('1111 1111b') commonly recorded in the entire disc informations and that four recording layers exist within a disc from $L^{th}$ byte ('0000 0100b').

Hence, in the another example of FIG. 5C, total thirty-two disc informations (four recording layers*eight writing speeds) exist and a sequence of the disc informations becomes '00h' (1×,L0)→'01h' (1×,L1)→'02h' (1×,L2)→'03h' (1×,L4)→'04h' (2×,L0)→ . . . →'31h' (16×, L4). This is done by a specified content according to a predetermined sequence. Thus, the entire disc informations should be configured according to the above manner to enable reciprocal compatibility for utilization.

In the another example of FIG. 5C, if a record playback unit (FIG. 10) intends to search disc information related to 2× speed (2×,L0) of a first recording layer to perform recording by applying a write strategy (WS) within the corresponding disc information, it can be known from the informations in the $M^{th}$ and $L^{th}$ bytes commonly recorded in the entire disc informations that total thirty-two disc informations (four recording layers*eight writing speeds) exist in the corresponding disc according to the sequence of the disc informations such as '00h' (1×,L0)→'01h'(1×,L1)→'02h'(1×,L2)→'03h'(1×, L4)→'04h'(2×,L0) → . . . →'31h' (16×,L4). Hence, the record playback apparatus (FIG. 9) enables to recognize that the disc information related to the 2× speed (2×,L0) of the first recording layer to be searched is '04h' and that the corresponding disc information ('04h') is recorded as the first type write strategy (WS-1) from the write strategy (WS) type identification information ('0000 0001b') recorded in the $N^{th}$ byte within the corresponding information ('04h'), thereby reading out parameter values of the first type write strategy (WS-1) via the $P^{th}$~$111^{th}$ bytes to utilize in the recording.

Likewise, if intending to search disc information related to 16× speed (16×,L3) of a fourth recording layer to perform recording by applying a write strategy (WS) within the corresponding disc information, the record playback unit (FIG. 9) recognizes that the corresponding disc information is '31h' via the same process and that the write strategy type (WS) is the second type (WS-2), thereby enabling to utilize them in the recording.

Figure 6:
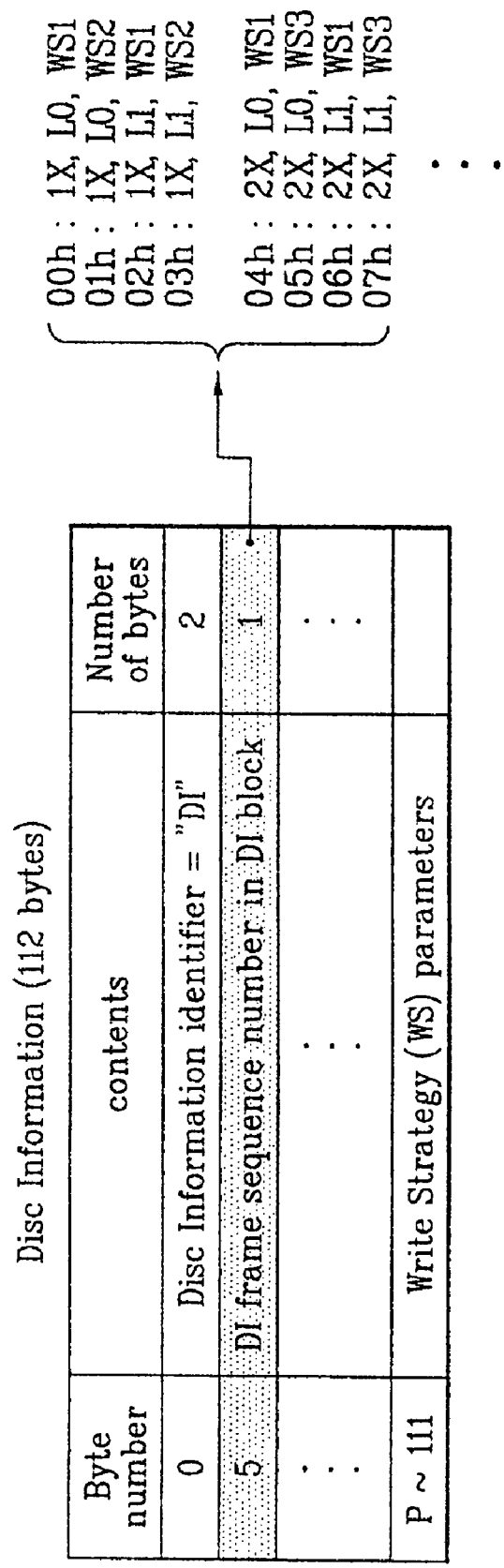

FIGS. 6 to 8 shows a method of recording disc information of an optical disc according to a third embodiment of the present invention. The second embodiment of the present invention is characterized in that at least one write strategy (WS) is configured for a same writing speed/recording layer. Namely, a plurality of disc informations associated with the same writing speed/recording layer can exist to be classified by WS types, respectively.

FIG. 6 shows a concept of the method of recording disc information of the optical disc according to the third embodiment of the present invention.

Referring to FIG. 6, a sequence for disc information each is decided by a sequence number and is recorded by 1-byte.

For instance, the information is recorded in $5^{th}$ byte within disc information, is named 'DI frame sequence number in DI block', and is briefly represented by '00h, 01h, 02h, . . . '. Namely, if the information of the $5^{th}$ byte is '00h', it means $1^{st}$ disc information. If the information of the $5^{th}$ byte is '07h', it means $8^{th}$ disc information.

In configuring disc information, the present invention is characterized in that disc information is separately provided per writing speed, per recording layer, and per write strategy (WS) and that a configuration sequence of a plurality of the separately provided disc informations is uniformly decided according to a predetermined manner.

For instance, if a corresponding optical disc includes a pair of recoding layers and a plurality of WS types exist, disc informations can be configured in a following manner.

'00h' of $1^{st}$ disc information is related to 1× speed, $1^{st}$ recording layer L0, and WS1. '01h' of $2^{nd}$ disc information is related to 1× speed, $1^{st}$ recording layer L0, and WS2. '02h' of $3^{rd}$ disc information is related to 1× speed, $2^{nd}$ recording layer L1, and WS1. '03h' of $4^{th}$ disc information is related to 1× speed, $2^{nd}$ recording layer L1, and WS2. '04h' of $5^{th}$ disc information is related to 2× speed, $1^{st}$ recording layer L0, and WS1. '05h' of $6^{th}$ disc information is related to 2× speed and $1^{st}$ recording layer L0, and WS3. '06h' of $7^{th}$ disc information is related to 2× speed, $2^{nd}$ recording layer L1, and WS1. And, '07h' of $8^{th}$ disc information is related to 2× speed, $2^{nd}$ recording layer L1, and WS3.

Namely, in configuring disc informations, the third embodiment according to the present invention is characterized in that at least one disc information is configured per writing speed, the respective per writing speed disc informations are reconfigured per recording layer, and at least one WS type is provided to each recording layer.

Hence, in configuring disc informations for the same writing speed/recording layer, it is able to configure a plurality of disc informations according to WS types.

FIG. 7A exemplarily shows a method of configuring disc information according the third embodiment of the present invention in FIG. 6.

Referring to FIG. 7A, 'DI frame sequence number in DI block' is provided to $5^{th}$ byte of each disc information to mean a sequence, which means that disc informations are configured in a specific order (writing speed→recording layer→WS type) of priority in FIG. 6.

And, 'Write Strategy (WS) Type' field ($N^{th}$ byte), 'Writing speed flag' field ($M^{th}$ byte), 'Number of Recording Layer' field ($L^{th}$ byte), and 'Write Strategy (WS) parameters' field ($P^{th}$~$111^{th}$ bytes) are recorded in $N^{th}$, $M^{th}$, $L^{th}$, and $P^{th}$~$111^{th}$ bytes, respectively. Meaning of each information recorded in the fields is the same of that of the second embodiment (FIG. 5A).

In FIG. 7A, 'Writing speed flag=0000 0111b' of $M^{th}$ byte means that three kinds of writing speeds are applicable. And, 'Number of Recording layer=0000 0010b' of $L^{th}$ byte means two recording layers exist.

Moreover, information informing a write strategy (WS) type applicable by a corresponding disc via specification is recorded in another specific area ($K^{th}$ byte) within disc information, which is named 'Write Strategy (WS) flag' field. For instance, whether a specific write strategy (WS) of eight kinds of write strategy (WS) types is applicable by the corresponding disc is represented by 1-bit each in the same area having 1-byte allocated thereto. Namely, it can be defined that the corresponding write strategy (WS) is not applicable (supported) if a bit value is '0b' in entire bits or that the corresponding write strategy (WS) is applicable (supported) if the bit value is '1b'. Hence, each of the bits b0~b7 within 1-byte becomes flag information indicating presence or non-presence of applicability of a specific write strategy (WS) type. For instance, if $1^{st}$ to $3^{rd}$ write strategy (WS) types WS1 to WS3 are applicable by a corresponding disc only, '0000 0111b' is written in $L^{th}$ byte. If all of the eight kinds of write strategy (WS) types WS1 to WS8 are applicable, '1111

1111b' is written in the $L^{th}$ byte. In FIG. 7A, '0000 1111b' is written in the $K^{th}$ byte to allow four write strategy (WS) types WS1 to WS4.

By writing the $M^{th}$, $L^{th}$, and $K^{th}$ byte informations recorded within the disc information by the same values in common to the entire disc informations, respectively, the record playback apparatus (FIG. 10) is facilitated to acquire the informations of the writing speed applicable by the corresponding disc, the write strategy (WS) type, and the number of the recording layers despite playing back any disc information.

Specifically, it may be able to record all kinds of the write strategy (WS) types applicable by specifications in configuring the disc informations. Yet, in such a case, the number of the recorded disc informations excessively increases. Moreover, a disc manufacturer should test the entire write strategy (WS) types and record the test results within the disc information, whereby it becomes a burden.

Therefore, in the embodiment according to the present invention, write strategies (WS) of which number (m) is smaller than that (n) of the maximum applicable write strategy types are recordable per writing speed within disc information and a disc manufacturer further enables to optionally record a specific one of a plurality of write strategies (WS), whereby disc manufacturer's convenience is secured as well as an efficient recording of disc information is enabled.

In FIG. 7A, recording is performed at 1× speed (1×) using $1^{st}$ and $2^{nd}$ type write strategies WS1 and WS2, at 2× speed (2×) using $2^{nd}$ and $3^{rd}$ type write strategies WS2 and WS3, or at $3^{rd}$ writing speed (3×) using $3^{rd}$ and $4^{th}$ type write strategies WS3 and WS4.

Namely, it is able to record disc information using write strategy (WS) types (two types) less than total applicable write strategy (WS) types (four types) per writing speed. And, it is able to confirm or verify the intrinsic write strategy (WS) applied to each disc information via 'Write Strategy (WS0 Type' field ($N^{th}$ byte) and 'Write Strategy (WS) parameters' field (Pth~$11^{th}$ bytes).

Figure 7B:
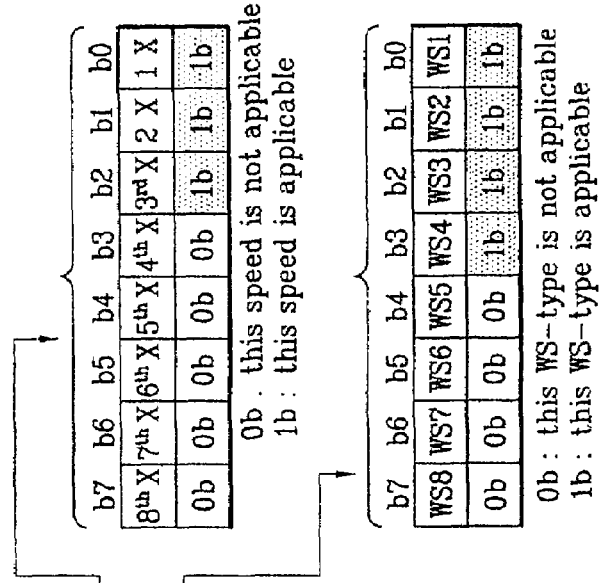

FIG. 7B shows another example of recording disc information according to the third embodiment of the present invention in FIG. 6. Like FIG. 7A, three kinds of applicable writing speeds exist and '0000 0111b' is written in $M^{th}$ byte. Four applicable write strategy types exist and '0000 1111b' is written in $K^{th}$ byte. And, two recording layers exist within a disc and '0000 0010b' is written in $L^{th}$ byte.

Referring to FIG. 7B, in configuring disc informations using one of a plurality of applicable write strategies (WS), at least one disc information is configured per the same writing speed and recording layer. In doing so, the most preferentially provided disc information is defined as a preferred WS provided by a disc manufacturer and another disc information following the preferred WS is defined as an alternative WS.

Namely, both disc information '00h' and disc information '01h' relate to 1× speed (1×) and $1^{st}$ recording layer (L0). Yet, the WS1 type recorded in '00h' as preferentially provided disc information becomes the preferred WS and the WS1 type information recorded in '01h' as a next provided one becomes the alternative WS.

And, disc information '04h', disc information '05h', and disc information '06h' relate to 2× speed (2×) and $1^{st}$ recording layer (L0). Yet, the WS2 type information recorded in '04h' as preferentially provided disc information becomes the preferred WS, and the WS1 type information recorded in '05h' and the WS3 type information recorded in '06h' as next provided ones become the alternative WSs, respectively. Namely, they can be applied to at least three disc informations of the same writing speed/recording layer.

Moreover, disc information '10h' relates to $3^{rd}$ speed ($3^{rd}$×) and $1^{st}$ recording layer (L0) and disc information '11h' relates to $3^{rd}$ speed ($3^{rd}$×) and $2^{nd}$ recording layer (L0). In case that only one WS type information is provided to the same writing speed/recording layer, the provided WS becomes the preferred WS.

Namely, when a disc manufacturer provides disc information within a disc according to the previously determined specification, an optical record playback apparatus (FIG. 9) reads out the disc information in a specific order (writing speed→recording layer). If a plurality of disc informations exist on the same writing speed/recording layer, the optical record playback apparatus (FIG. 10) recognizes the preferentially provided WS within the disc information as the preferred WS and the next WS as the alternative WS additionally provided by a disc manufacturer, thereby enabling record playback using disc information efficiently.

Even if both of the preferred WS and the alternative WS are 'optional WS' a disc manufacturer enables to select optionally, it may be possible to render the preferred WS into 'mandatory WS' and the alternative WS into 'optional WS' only.

FIG. 8 shows another example of recording disc information according to the third embodiment of the present invention in FIG. 6, in which a disc manufacturer directly provides information of a most preferred write strategy (WS) type at a specific writing speed.

Referring to FIG. 8, 'Write Strategy (WS) Type' field ($N^{th}$ byte), 'Writing speed flag' field ($M^{th}$ byte), 'Write Strategy (WS) flag' field ($K^{th}$ byte), 'Number of Recording Layer' field ($L^{th}$ byte), and 'Write Strategy (WS) parameters' field ($P^{th}$~$111^{th}$ bytes) are recorded in $N^{th}$, $M^{th}$, $K^{th}$, $L^{th}$, and $P^{th}$~$111^{th}$ bytes, respectively. Meaning of each information recorded in the fields is the same of that of the second embodiment (FIG. 7B).

And, 'Best WS flag in Writing speed' field is provided to another specific area ($Q^{th}$ byte) within disc information, whereby a disc manufacturer provides information of a WS indicating a best quality among a plurality of write strategies (WS) existing per same writing speed. For example, FIG. 8 shows that $2^{nd}$ WS (WS2) is the 'Best WS' of eight applicable WSs at a specific writing speed.

In case that a plurality of WSs enable to exist for the same writing speed/recording layer like FIG. 7A, an optical record playback apparatus (FIG. 10) is unable to distinguish which is the most appropriate WS for a corresponding writing speed. Hence, the optical record play back apparatus computes the optimal WS by applying the entire WSs provided to the disc information. Yet, by providing the 'Best WS flag in Writing speed' field to the $Q^{th}$ byte, it is able to apply to utilize the WS recorded in the $Q^{th}$ byte preferentially.

In case that a plurality of WSs exist for the same writing speed/recording layer like FIG. 7B, it is able to recognize the WS recorded in $1^{st}$ disc information as the preferred WS by a previously specified decided method. Yet, by providing the 'Best WS flag in Writing speed' field to the $Q^{th}$ byte, it is able to reconfirm the preferred WS as well. Moreover, in case that the preferred WS recorded in the $1^{st}$ disc information for the same writing speed/recording layer is different from the 'Best WS flag in Writing speed' information of the $Q^{th}$ byte, e.g., if the preferred WS is 'mandatory WS' decided in a mandatory manner, a priority is given to the information of the $Q^{th}$ byte provided by a disc manufacturer, thereby enabling to provide the information more efficiently in deciding the optimal WS at the same writing speed.

FIG. 9A to 9E are a diagram of recording control information according to the fourth embodiment of the present invention. The recording control information is dependent on a recording method, e.g., CLV mode or CAV mode, in which information for identifying a type of disc information, e.g., CLV mode or CAV mode is recorded within disc information with another information enabling to identify a type of write strategy (WS) finally used.

Figure 9A:
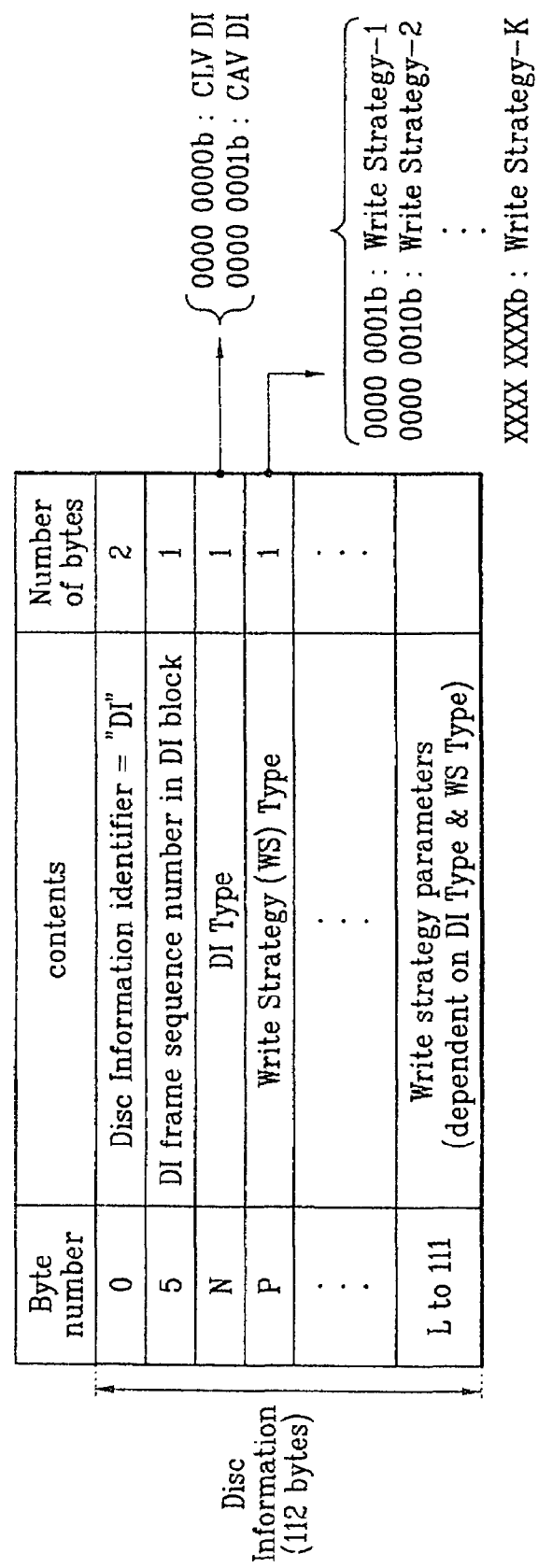

Referring to FIG. 9A, the information enabling to identify a write strategy (WS) type is to identify which one of a plurality of specified write strategies (WS) was selected to be used by a disc manufacturer, whereas the information for identifying a disc information type enables to identify whether corresponding disc information is in CLV mode or CAV mode. For instance, as mentioned in the foregoing description, various write strategy types, which can exist such as (n−1) WS, n/2 WS, etc., are defined as $1^{st}$ WS WS-1, $2^{nd}$ WS WS-2, and $K^{th}$ WS WS-K. And, the information identifying the write strategy type (named 'WS Type') selected by a disc manufacturer is recorded within disc information.

Figure 9B:
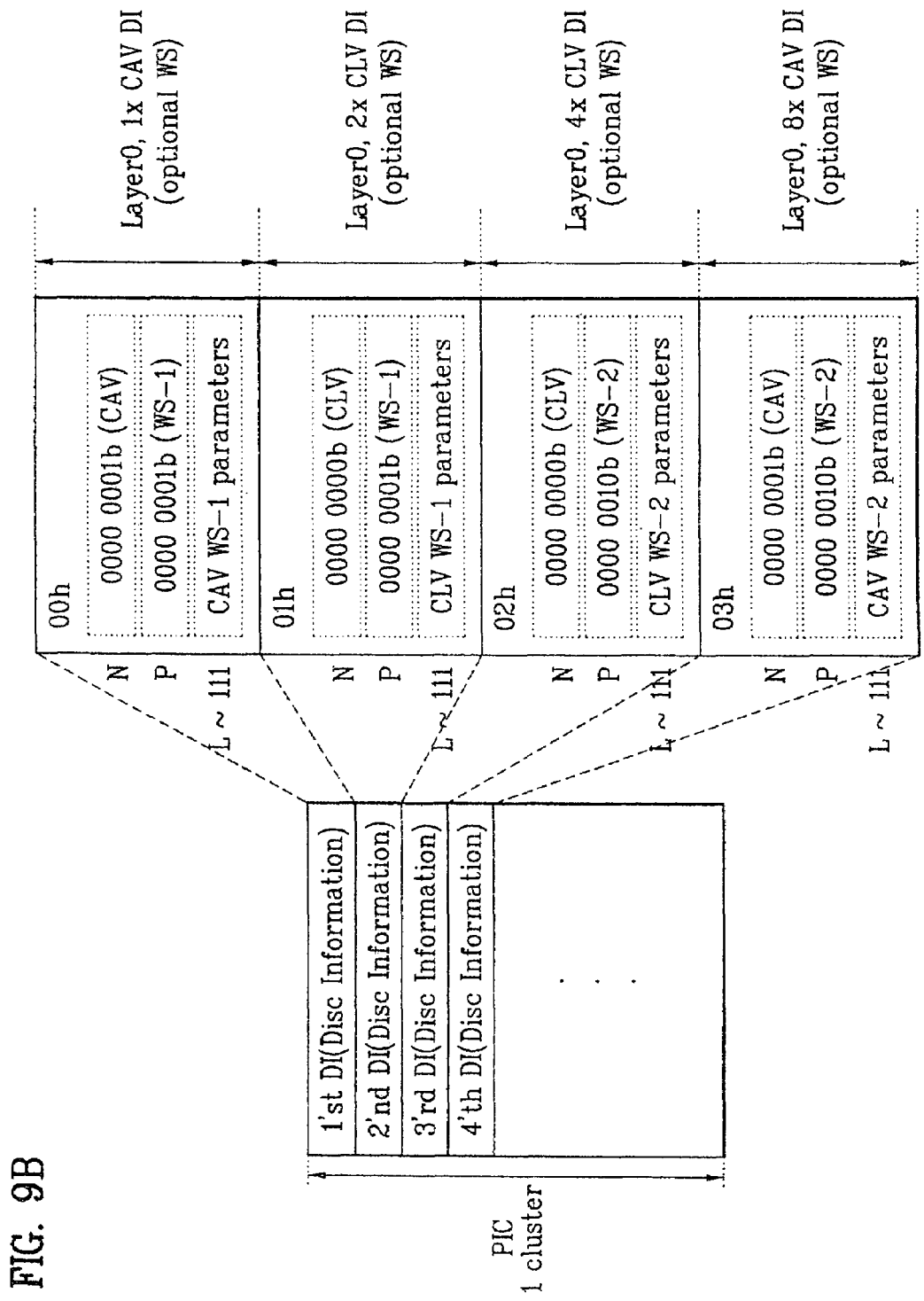
Figure 9C:
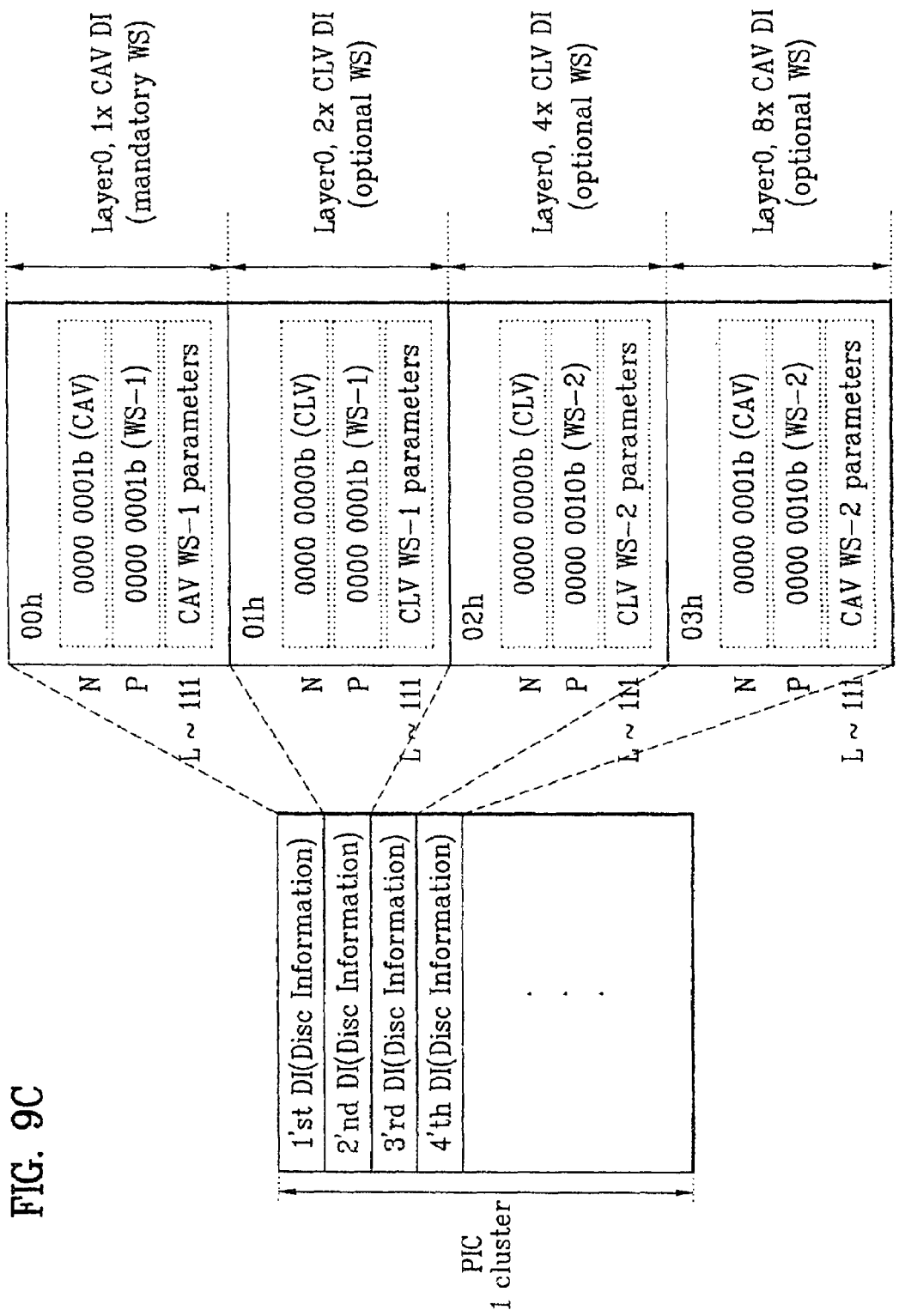

FIG. 9B is a diagram of recording a write strategy within control information according to the fourth embodiment of the present invention in FIG. 9A, and FIG. 9C is a diagram of another example of recording a write strategy within control information according to the fourth embodiment of the present invention in FIG. 9A.

FIG. 9B shows that a disc manufacturer optionally records a specific write strategy (WS) for entire writing speeds in recording one of a plurality of write strategies (WS).

Referring to FIG. 9B, $N^{th}$ byte of disc information indicates a disc information type, $P^{th}$ byte of disc information indicates a write strategy (WS) type, and parameters associated with one write strategy (WS) decided by interworking with the $N^{th}$ and $P^{th}$ bytes are recorded in $L^{th} \sim 11^{th}$ bytes.

For instance, disc information for 1× speed of $1^{st}$ recording layer is recorded in '00h' as a disc information sequence, a disc information type means a CAV mode, a write strategy (WS) type means $1^{st}$ WS WS-1, and a write strategy (WS) interworks with them so that a CAV WS-1 is selected to be recorded. Disc information for 2× speed of $1^{st}$ recording layer is recorded in '01h', a disc information type means a CLV mode, a write strategy (WS) type means $1^{st}$ WS WS-1, and a write strategy (WS) interworks with them so that a CLV WS-1 is selected to be recorded. Disc information for 4× speed of $1^{st}$ recording layer is recorded in '02h', a disc information type means a CLV mode, a write strategy (WS) type means $2^{nd}$ WS WS-2, and a write strategy (WS) interworks with them so that a CLV WS-2 is selected to be recorded. Disc information for 8× speed of $1^{st}$ recording layer is recorded in '03h', a disc information type means a CAV mode, a write strategy (WS) type means $2^{nd}$ WS WS-2, and a write strategy (WS) interworks with them so that a CAV WS-2 is selected to be recorded.

FIG. 9C shows that one of a plurality of write strategies (WS) is recorded within disc information, in which a mandatory write strategy (WS) type is recorded for a specific specified writing speed (e.g., 1× speed) but a disc manufacturer optionally records a specific write strategy (WS) for the rest writing speeds.

Hence, the method in FIG. 9C differs from the method in FIG. 9B in that a write strategy (WS) type is decided in a mandatory manner by putting limitation on disc manufacturer's options for a specific writing speed (1× speed). This enables a manufacturer of a disc recording/reproducing apparatus (FIG. 10) to design to manufacture inexpensive products coping with one write strategy (WS) type only.

For instance, disc information for 1× speed of $1^{st}$ recording layer is recorded in '00h' as a disc information sequence, a disc information type means a CAV mode, a write strategy (WS) type means $1^{st}$ WS WS-1, and a write strategy (WS) interworks with them so that a CAV WS-1 is selected in a mandatory manner to be recorded. Disc information for 2× speed of $1^{st}$ recording layer is recorded in '01h', a disc information type means a CLV mode, a write strategy (WS) type means $1^{st}$ WS WS-1, and a write strategy (WS) interworks with them so that a CLV WS-1 is selected to be recorded. Disc information for 4× speed of $1^{st}$ recording layer is recorded in '02h', a disc information type means a CLV mode, a write strategy (WS) type means $2^{nd}$ WS WS-2, and a write strategy (WS) interworks with them so that a CLV WS-2 is selected to be recorded. Disc information for 8× speed of $1^{st}$ recording layer is recorded in '03h', a disc information type means a CAV mode, a write strategy (WS) type means $2^{nd}$ WS WS-2, and a write strategy (WS) interworks with them so that a CAV WS-2 is selected to be recorded.

FIG. 9D shows another example of recording control information according to the fourth embodiment of the present invention, in which specific identification for CAV mode is subdivided to be applied to 'DI Type' field written in $N^{th}$ byte within disc information and in which information designating a write strategy (WS) type is recorded as well.

Referring to FIG. 9D, in case that corresponding disc information means CAV mode, this is subdivided to identify how many velocities are provided by a write strategy (WS). Hence, 'DI Type' field can be defined as follows. If 'DI Type' field recorded in $N^{th}$ byte is '0000 0001b', it means CAV mode and a write strategy (WS) recorded in $L^{th} \sim 111^{th}$ bytes is recorded to correspond to one kind of velocity only. If 'DI Type' field recorded in $N^{th}$ byte is '0000 0010b', it means CAV mode and a write strategy (WS) recorded in $L^{th} \sim 111^{th}$ bytes is recorded to correspond to two kinds of velocities. If 'DI Type' field recorded in $N^{th}$ byte is '0000 0011b', it means CAV mode and a write strategy (WS) recorded in $L^{th} \sim 111^{th}$ bytes is recorded to correspond to three kinds of velocities.

Moreover, 'Write Strategy (WS) Type' field is added to $P^{th}$ byte within disc information so that $L^{th} \sim 111^{th}$ write strategy (WS) is recorded by interworking with a disc information type in $N^{th}$ byte and a write strategy (WS) type in $P^{th}$ byte. Namely, it can be defined as follows. If '0000 0000b' is written in $P^{th}$ byte, it means $1^{st}$ WS WS-1. If '0000 0010b' is written in $P^{th}$ byte, it means $2^{nd}$ WS WS-2. And, if 'XXXX XXXXb' is written in $P^{th}$ byte, it means $K^{th}$ WS WS-K.

FIG. 9E is a diagram of recording a write strategy within control information comparable to FIG. 9D.

Referring to FIG. 9E, '0000 0000b' is written in 'DI Type' field of $N^{th}$ byte to mean CLV mode. '0000 0001b' is written in 'Write Strategy (WS) Type' field of $P^{th}$ byte to mean 1 WS WS-1. $5^{th}$ byte is '00h' to mean 1× speed disc information of 1 recording layer. And, a specific write strategy (WS) interworking with the $N^{th}$ and $P^{th}$ bytes is written in $L^{th} \sim 111^{th}$ bytes within a disc.

As it is a CLV mode, a write strategy (WS) for one kind of velocity is recorded. As it is $1^{st}$ WS WS-1, parameters by '(n−1) WS' type are defined for example. Accordingly, a disc manufacturer records an optimal value in a corresponding disc.

If 'DI Type' field ($N^{th}$ byte) is set to '0000 0001b' to mean a CAV mode, or if 'Write Strategy (WS) Type' field is set to '0000 0010b' to mean $2^{nd}$ WS WS-2, it is apparent that write strategy (WS) parameters written in $L^{th} \sim 111^{th}$ bytes should be recorded as new contents different from the parameters specified in FIG. 9E or the values of the corresponding parameters.

Figure 10:
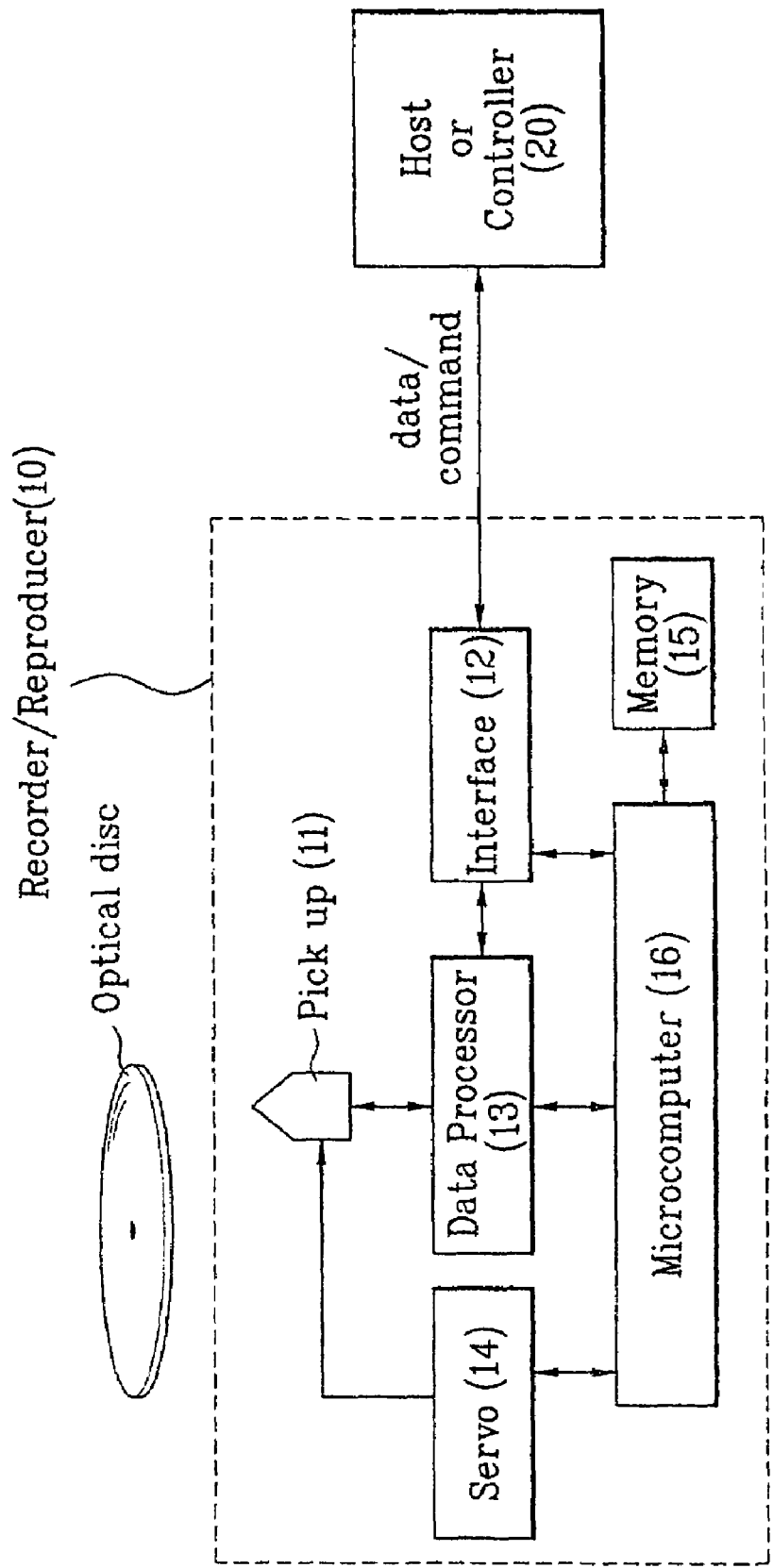
FIG. 10 is a block diagram of an optical disc recording and reproducing apparatus according to the present invention.

FIG. 10 is a block diagram of an optical disc record playback according to the present invention.

Referring to FIG. 10, a record playback apparatus according to the present invention includes a record playback unit 10 carrying out record playback on an optical disc and a control unit 20 controlling the record playback unit 10.

The control unit 20 gives a record or playback command for a specific area, and the record playback unit 10 caries out the record/playback for the specific area according to the command of the control unit 20. Specifically, the record playback unit 10 includes an interface unit 12 performing communications with an external device, a pickup unit 11 directly recording data on the optical disc or playing back the data, a data processor 13 receiving a playback signal from the pickup unit 11 to restore into a necessary signal value or modulating to deliver a signal to be recorded into a signal to be recorded on the optical disc, a servo unit 14 reading out a signal from the optical disc correctly or controlling the pickup unit 11 to record a signal on the optical disc correctly, a memory 15 temporarily storing disc control information including disc control information, and a microcomputer 16 responsible for controlling the above-described elements within the record playback unit 10.

A recording process of an optical disc according to the present invention is explained in detail as follows.

First of all, once an optical disc is loaded in the optical record playback apparatus, the entire disc management information within the disc is read out to be temporarily stored in the memory 15 of the record playback unit 10. Also, a specific disc management information only can be read from the optical disc. And, various kinds of the disc management information are utilized for the record/playback of the optical disc. Specifically, the management information stored in the memory 15 includes disc control information of the present invention. Hence, the recording layer information, writing speed information, and write strategy fitting the corresponding writing speed recorded within the disc information are read out to be stored in the memory.

If intending to perform a recording on a specific area within the optical disc, the control unit 20 renders such an intent into a writing command and then delivers it to the record playback unit 10 together with data for writing location information to be recorded. After receiving the writing command, the microcomputer 16 decides or selects the corresponding writing speed to be applied to an intended recording layer within the optical disc from the management informations stored in the memory 15 and then performs the writing command using a (pre-)determined or selected write strategy type and the write strategy parameters applicable to the decided or selected writing speed.

Specifically, in case that the recording is performed on the optical disc by the present invention, the disc information as management information is provided in a specific order and the microcomputer 16 recognizes which WS is the preferred WS of the disc manufacturer in the same writing speed/recording layer. Therefore, it is more facilitated to perform the recording on a specific recoding layer within an optical disc at a specific writing speed.

Accordingly, the present invention provides various methods of providing disc control information coping with higher writing speed in a high-density optical disc, thereby enabling to uniformly apply the standardized disc control information to efficiently cope with the record/playback of the optical disc.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A data structure of a control information for use with a recording medium having multi-recording layers, the control information including first information unit for a first recording layer and second information unit for a second recording layer, wherein the first information unit includes write strategy parameters for first write strategy type to be used for the first recording layer, and the second information unit includes write strategy parameters for second write strategy type to be used for the second recording layer, the second write strategy type being different from the first write strategy type, and wherein each of the first and second write strategy types is an n−1 write strategy type or an n/2 write strategy type, where n is a length of mark and each of the n−1 and n/2 represents the number of write pulses to form the mark.

2. The data structure of claim 1, wherein the data structure is to record on the recording medium, to record a main data on the recording medium based on the control information recorded as the data structure in the recording medium, or recorded on the recording medium.

3. The data structure of claim 2, wherein each information unit includes an identification information identifying the first write strategy type and the second write strategy type, respectively.

4. The data structure of claim 3, wherein each identification information identifies one of an n−1 write strategy type and an n/2 write strategy type, where n is a length of mark and each type represents a number of write pulses to form a corresponding mark.

5. The data structure of claim 2, wherein the first write strategy type for the first recording layer and the second write strategy type for the first recording layer are same, wherein the first and second write strategy types are an n−1 write strategy type or an n/2 write strategy type.

6. The data structure of claim 2, wherein the first write strategy type for the first recording layer and the second write strategy type for the first recording layer are different, wherein the first write strategy type is an n−1 write strategy type or an n/2 write strategy type and the second write strategy type is an n−1 write strategy type or an n/2 write strategy type.

7. The data structure of claim 6, wherein the first write strategy type is an n−1 write strategy type and the second write strategy type is an n/2 write strategy type.

8. The data structure of claim 6, wherein the first write strategy type is an n/2 write strategy type and the second write strategy type is an n−1 write strategy type.

9. The data structure of claim 2, wherein the control information further includes an alternative information unit for alternative write strategy type applicable to each recording layer.

10. The data structure of claim 9, wherein the first write strategy type for the first recording layer is an n−1 write strategy type and alternative write strategy type is an n/2 write strategy type while the second write strategy type for the second recording layer is an n/2 write strategy type and alternative write strategy type is an n−1 write strategy type, where n is a length of mark and each type represents a number of write pulse to form a corresponding mark.

11. The data structure of claim 2, wherein each information unit includes a recording layer number information to identify a corresponding recording layer.

12. The data structure of claim 2, wherein each information unit includes type information identifying an applicable write strategy type.

13. A method of recording data, comprising:
reading a control information, the control information including first information unit for a writing speed and first recording layer and second information unit for the same writing speed and second recording layer, the first information unit including write strategy parameters for first write strategy type to be used for the writing speed and first recording layer, and the second information unit including write strategy parameters for second write strategy type to be used for the same writing speed and second recording layer, the second write strategy type being different from the first write strategy type, wherein each of the first and second write strategy types is an n−1 write strategy type or an n/2 write strategy type, where n is a length of mark and each of the n−1 and n/2 represents the number of write pulses to form the mark; and
recording a main data at the writing speed using the corresponding write strategy parameters to the corresponding recording layer.

14. The method of claim 13, further comprising:
identifying at least one of the first and second information units based on an identification information,
wherein the recording step records the main data on a specific recording layer based on the identified information unit.

15. The method of claim 13, wherein the second write strategy type is same as the first write strategy type, wherein the first and second write strategy types are an n−1 write strategy type or an n/2 write strategy type.

16. The method of claim 13, wherein the second write strategy type is different from the first write strategy type, wherein the first write strategy type is an n−1 write strategy type and the second write strategy type is an n/2 write strategy type, further comprising:
identifying the corresponding write strategy type to record the main data to the corresponding recording layer.

17. The method of claim 13, wherein the second write strategy type is different from the first write strategy type, wherein the first write strategy type is an n/2 write strategy type and the second write strategy type is an n−1 write strategy type, further comprising:
identifying the corresponding write strategy type to record the main data to the corresponding recording layer.

18. The method of claim 13, wherein the control information further includes an alternative information unit for alternative write strategy type applicable to each recording layer,
wherein the recording step records the main data using one of first write strategy type and the alternative write strategy type for the first recording layer and using one of second write strategy type and the alternative write strategy type for the second recording layer.

19. The method of claim 18, wherein the first write strategy type for first recording layer is an n−1 write strategy type and alternative write strategy type is an n/2 write strategy type while the second write strategy type for second recording layer is an n/2 write strategy type and alternative write strategy type is an n−1 write strategy type, where n is a length of mark and each type represents a number of write pulse to form a corresponding mark, further comprising:
determining a corresponding write strategy type to record the main data on the corresponding recording layer.

20. The method of claim 13, wherein each information unit includes type information identifying an applicable write strategy type, further comprising:
identifying an applicable write strategy type,
wherein the recording step records the main data according to the identified applicable write strategy type.

21. The method of claim 13, further comprising:
specifying a recording layer to record the main data; and
determining a write strategy type based on the determination,
wherein the recording step records the main data using write strategy parameters for the determined write strategy type on the specified recording layer.

22. A method of recording data, comprising:
reading a control information, the control information including at least first information unit for a first recording layer and second information unit for a second recording layer, the first information unit including write strategy parameters for first write strategy type to be used for the first recording layer and the second information unit including write strategy parameters for second write strategy type to be used for the second recording layer, wherein the first write strategy type is one of an n−1 write strategy type and an n/2 write strategy type and the second write strategy type is one of an n−1 write strategy type and an n/2 write strategy type, the first write strategy type being different from the second write strategy type, where n is a length of mark and each type represents a number of write pulse to form a corresponding mark; and
recording a main data using the write strategy parameters for the first or second write strategy type at the corresponding recording layer.

23. The method of claim 22, wherein the recording step records the main data using the n−1 write strategy type for the first recording layer while using the n/2 write strategy type for the second recording layer.

24. The method of claim 23, wherein the recording step records the main data using the number of pulses one less than the mark length to form a corresponding mark for the first recording layer, while using the number of pulses corresponding to half the mark length to form a corresponding mark for the second recording layer, the integer number of pulses from the result being only available.

25. The method of claim 23, wherein each write strategy type is applied to the corresponding recording layer with same recording speed.

26. The method of claim 22, further comprising:
specifying a recording layer to record the main data,
wherein the recording step records the main data using write strategy parameters for the write strategy type for the specified recording layer.

27. The method of claim 26, wherein the recording step records the main data using the n−1 write strategy type for the first recording layer while using the n/2 write strategy type for the second recording layer.

28. The method of claim 26, wherein the recording step records the main data using the n/2 write strategy type for the first recording layer while using the n−1 write strategy type for the second recording layer.

29. An apparatus for recording data, comprising:
a controller configured to generate a recording command for a specific recording layer from a multi-layer recording medium and control a recording operation; and
a recorder/reproducer configured to perform a recording of data, based on the recording command from the controller, by reading a control information, the control information including first information unit for a first recording layer and second information unit for a second recording layer, the first information unit including write strategy parameters for first write strategy type to be used for the first recording layer and second information unit including write strategy parameters for second write strategy type to be used for the second recording layer, wherein the first write strategy type is one of an n−1 write strategy type and an n/2 write strategy type and the second write strategy type is one of an n−1 write strategy type and an n/2 write strategy type, the first write strategy type being different from the second write strategy type, where n is a length of mark and each type represents a number of write pulse to form a corresponding mark, wherein the recorder/reproducer is configured to perform the recording of data on the corresponding recording layer using the corresponding write strategy type, according to a control of the controller.

30. The apparatus of claim 29, wherein the controller is configured to identify at least one of first and second information units based on an identification information required for identifying a specific write strategy type, and control the recorder/reproducer to record the main data on the specific recording layer using write strategy parameters included in the identified information unit.

31. The apparatus of claim 29, wherein the controller is configured to specify a recording layer to record the main data, and determine a write strategy type based on the determination, wherein the recorder/reproducer is configured to record the main data using write strategy parameters for the determined write strategy type at the specified recording layer.

32. The apparatus of claim 29, further comprising:

a memory configured to store the read control information, wherein the controller is configured to identify the corresponding information unit based on an identification information identifying the at least one of the first write strategy type and the second write strategy type from the control information stored in the memory.

33. The apparatus of claim 29, wherein the first write strategy type is same as the second write strategy type, wherein the controller is configured to control the recorder/reproducer to record the main data using n−1 or n/2 write strategy types to the first recording layer or the second recording layer.

34. The apparatus of claim 29, wherein the first write strategy type is different from the second write strategy type, wherein the controller is configured to control the recorder/reproducer to record the main data using n−1 write strategy type to the first recording layer while records the main data using n/2 write strategy type to the second recording layer.

35. The apparatus of claim 29, wherein the first write strategy type is different from the second write strategy type, wherein the controller is configured to control the recorder/reproducer to record the main data using n/2 write strategy type to the first recording layer while records the main data using n−1 write strategy type to the second recording layer.

36. The apparatus of claim 29, wherein each information unit includes type information identifying an applicable write strategy type, and the controller is configured to control the recorder/reproducer to record the main data to the corresponding recording layer based on an applicable write strategy identified by type information.

37. An apparatus for recording data, comprising:

a writing/reading unit configured to read at least one control information and to record a main data on a specific recording layer from a multi-layer recording medium, the control information including first information unit for a writing speed and a first recording layer and, second information unit for the same writing speed and a second recording layer, the first information unit including write strategy parameters for first write strategy type to be used for the writing speed and the first recording layer, and second information unit including write strategy parameters for second write strategy type to be used for the same writing speed and the second recording layer, the second write strategy type being different from the first write strategy type, each write strategy type being one an n−1 write strategy type and an n/2 write strategy type, where n is a length of mark and each type represents a number of write pulse to form a corresponding mark; and a controller configured to control the writing/reading unit to record the main data on each recording layer based on at least one of the first and second write strategy types, wherein the controller is configured to determine a specific write strategy type to record the main data on the corresponding recording layer and apply the determined write strategy type applicable to the corresponding recording layer.

38. The apparatus of claim 37, wherein the controller is configured to control the writing/reading unit such that the n−1 write strategy type is applied to the first recording layer and the n/2 write strategy type is applied to the second recording layer.

39. The apparatus of claim 38, wherein the controller is configured to control the writing/reading unit to record the main data using the number of pulses one less than the mark length to form a corresponding mark for the first recording layer, while using the number of pulses corresponding to half the mark length to form a corresponding mark for the second recording layer, the integer number of pulses from the result being only available.

40. The apparatus of claim 37, wherein the controller is configured to control the writing/reading unit such that the n/2 write strategy type is applied to the first recording layer and the n−1 write strategy type is applied to the second recording layer.

41. The apparatus of claim 40, wherein the controller is configured to control the writing/reading unit to record the main data using the number of pulses corresponding to half the mark length to form a corresponding mark for the second recording layer, the integer number of pulses from the result being only available, while using the number of pulses one less than the mark length to form a corresponding mark for the first recording layer.

42. The apparatus of claim 37, wherein the controller is configured to specify a recording layer to record the main data, and determine a write strategy type based on the determination, wherein the writing/reading unit is configured to record the main data using write strategy parameters for the determined write strategy type at the specified recording layer, according to the control of the controller.

* * * * *